US012019029B2

(12) United States Patent
Kudo et al.

(10) Patent No.: US 12,019,029 B2
(45) Date of Patent: Jun. 25, 2024

(54) OPTICAL SYSTEM, AND IMAGING APPARATUS AND IMAGING SYSTEM INCLUDING THE SAME

(71) Applicant: CANON KABUSHIKI KAISHA, Tokyo (JP)

(72) Inventors: Genichiro Kudo, Tochigi (JP); Kazumi Kimura, Saitama (JP); Hiroki Yoshida, Tochigi (JP); Hiroto Kano, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 17/108,561

(22) Filed: Dec. 1, 2020

(65) Prior Publication Data

US 2021/0080401 A1    Mar. 18, 2021

Related U.S. Application Data

(63) Continuation of application No. PCT/JP2019/021340, filed on May 29, 2019.

(30) Foreign Application Priority Data

Jun. 7, 2018  (JP) ................................ 2018-109857
Jun. 7, 2018  (JP) ................................ 2018-109858
(Continued)

(51) Int. Cl.
*G01N 21/88* (2006.01)
*G01J 3/02* (2006.01)
(Continued)

(52) U.S. Cl.
CPC .......... *G01N 21/8851* (2013.01); *G01J 3/021* (2013.01); *G01N 21/314* (2013.01);
(Continued)

(58) Field of Classification Search
CPC .. G01N 21/8851; G01N 21/314; G01N 21/47; G01N 21/8806; G01N 2021/8466;
(Continued)

(56) References Cited

U.S. PATENT DOCUMENTS 2,890,622 A    6/1959  Wallin
6,046,808 A    4/2000  Fateley
(Continued)

FOREIGN PATENT DOCUMENTS

CN    101680844 A    3/2010
EP      0364951 A2    4/1990
(Continued)

OTHER PUBLICATIONS

Reimers, et al., "Freeform spectrometer enabling increased compactness", Light: Science & Applications, 6, e17026, doI: 10.1038/lsa2017.26, (Jul. 2017).
(Continued)

*Primary Examiner* — Dominic J Bologna
(74) *Attorney, Agent, or Firm* — Canon U.S.A., Inc. IP Division

(57) ABSTRACT

Optical system includes front group, light-shielding member, and rear group that are arranged in this order in direction from object side toward image side. The light-shielding member is provided with opening elongated in first direction. The front group has aspherical surfaces, does not image the object at the opening in first section parallel to the first direction, and forms intermediate image of the object at the opening in second section perpendicular to the first direction. The rear group has diffractive surface that splits light beam that passes through the opening into light beams at different wavelengths in the second section and focuses the
(Continued)

light beams on different locations in the second section. Tilt angles of the aspherical surfaces in the second section change in the first direction.

20 Claims, 21 Drawing Sheets

(30) Foreign Application Priority Data

| Jun. 7, 2018 | (JP) | 2018-109859 |
|---|---|---|
| Jun. 7, 2018 | (JP) | 2018-109860 |
| Jun. 7, 2018 | (JP) | 2018-109861 |
| Jun. 7, 2018 | (JP) | 2018-109862 |
| Jun. 7, 2018 | (JP) | 2018-109863 |
| Mar. 11, 2019 | (JP) | 2019-044279 |

(51) Int. Cl.

| G01J 3/28 | (2006.01) |
|---|---|
| G01N 21/31 | (2006.01) |
| G01N 21/47 | (2006.01) |
| G01N 21/84 | (2006.01) |
| G02B 5/00 | (2006.01) |
| G02B 13/02 | (2006.01) |
| G02B 13/04 | (2006.01) |
| G02B 13/08 | (2006.01) |
| G02B 17/08 | (2006.01) |
| G02B 27/10 | (2006.01) |
| G02B 27/42 | (2006.01) |
| H04N 23/00 | (2023.01) |

(52) U.S. Cl.
CPC ......... *G01N 21/47* (2013.01); *G01N 21/8806* (2013.01); *G02B 5/005* (2013.01); *G02B 13/02* (2013.01); *G02B 13/04* (2013.01); *G02B 13/08* (2013.01); *G02B 17/0836* (2013.01); *G02B 17/0848* (2013.01); *G02B 27/1086* (2013.01); *G02B 27/4205* (2013.01); *H04N 23/00* (2023.01); *G01J 3/2823* (2013.01); *G01N 2021/8466* (2013.01); *G01N 2201/0635* (2013.01)

(58) Field of Classification Search
CPC .................. G01N 2201/0635; G01J 3/021; G01J 3/2823; G02B 5/005; G02B 13/02; G02B 13/04; G02B 13/08; G02B 17/0836; G02B 17/0848; G02B 27/1086; G02B 27/4205; H04N 23/00
See application file for complete search history.

(56) References Cited

U.S. PATENT DOCUMENTS

| 6,084,727 A | 7/2000 | Cook | |
|---|---|---|---|
| 6,313,955 B1* | 11/2001 | Yoneyama | G02B 9/08 |
| | | | 359/745 |
| 7,199,877 B2 | 4/2007 | Kehoe | |
| 8,285,026 B2 | 10/2012 | Dirix | |
| 2005/0013021 A1 | 1/2005 | Takahashi | |
| 2006/0082772 A1* | 4/2006 | Kehoe | G01J 3/2823 |
| | | | 356/328 |
| 2010/0046826 A1* | 2/2010 | Dirix | B07C 5/3422 |
| | | | 382/141 |
| 2010/0142062 A1 | 6/2010 | Asami | |
| 2010/0238440 A1 | 9/2010 | Oskotsky et al. | |
| 2011/0109903 A1 | 5/2011 | Lee et al. | |
| 2018/0066987 A1* | 3/2018 | Swanson | G01J 3/2823 |
| 2021/0080401 A1 | 3/2021 | Kudo | |
| 2021/0080402 A1* | 3/2021 | Kano | G02B 27/4205 |

FOREIGN PATENT DOCUMENTS

| FR | 2970075 A1 | 7/2012 |
|---|---|---|
| JP | 2002092928 A | 3/2002 |
| WO | 2005/086818 A2 | 9/2005 |
| WO | 2005/088264 A1 | 9/2005 |

OTHER PUBLICATIONS

Anamorphic format, Wikipedia.org, https://en.wikipedia.org/wiki/Anamorphic_format, downloaded Jan. 11, 2022.
Cylinder lens, Wikipedia.org, https://en.wikipedia.org/wiki/Cylindrical_lens, downloaded Jan. 11, 2022.
Cylindrical lenses offer many focusing options, Optics.org, https://optics.org/article/37057, Dec. 2008.

* cited by examiner

FIG. 3
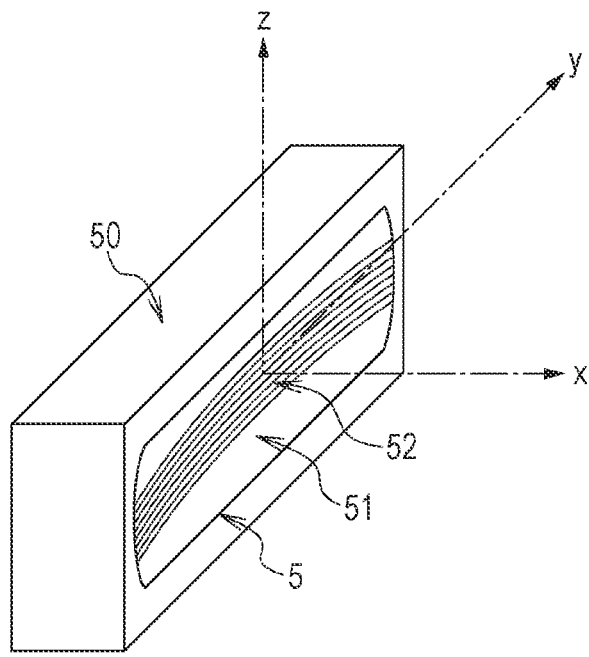
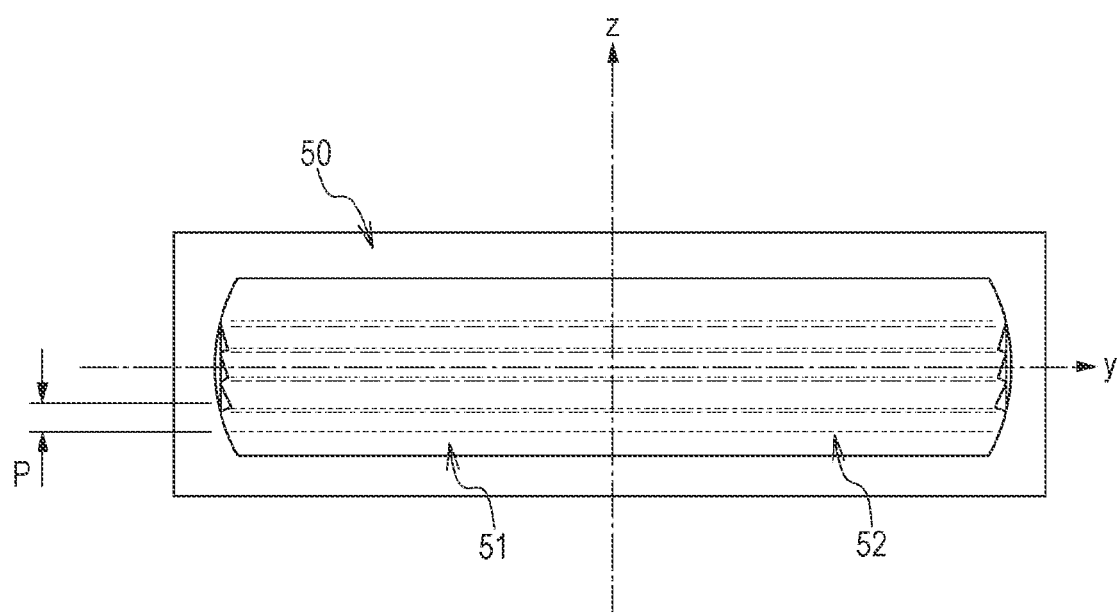

FIG. 4
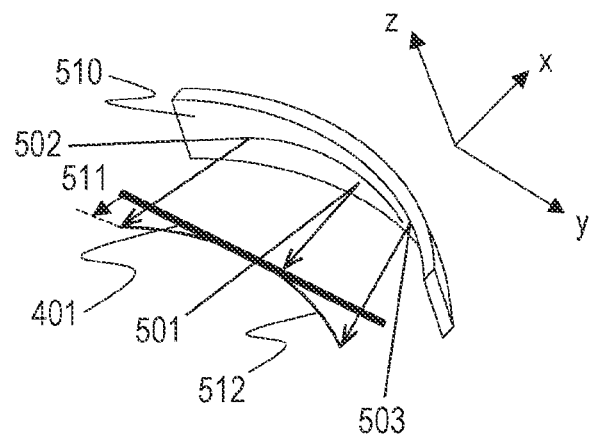
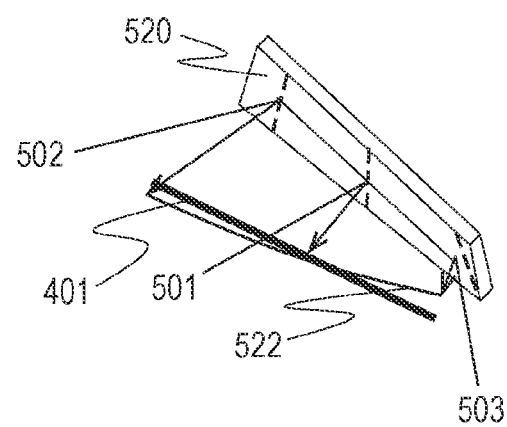
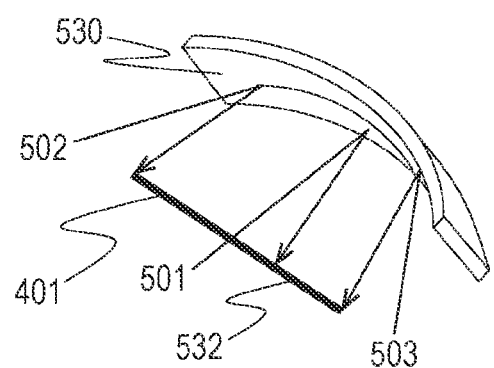

FIG. 5
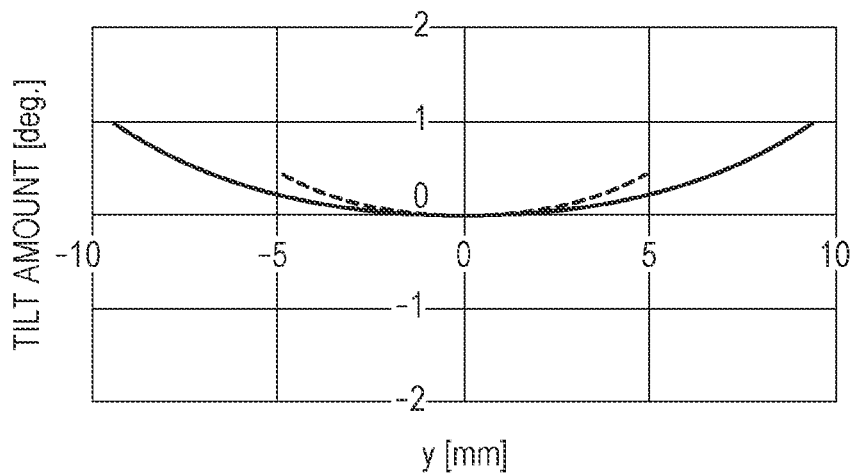
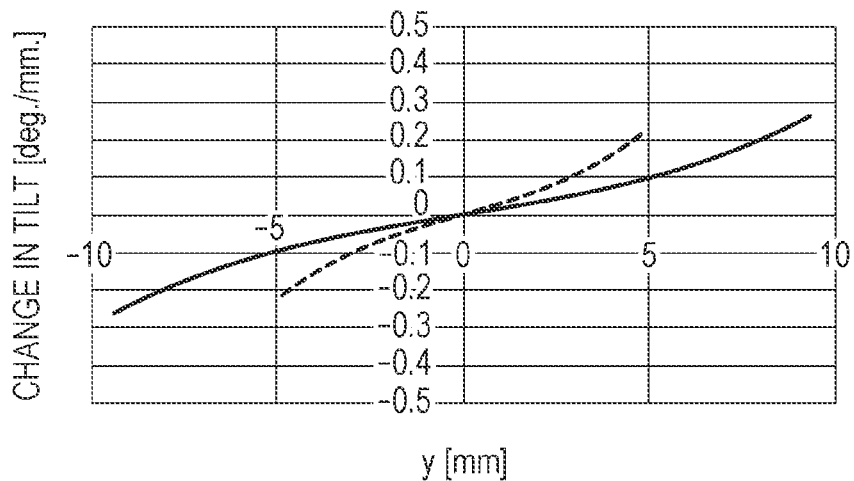

FIG. 7
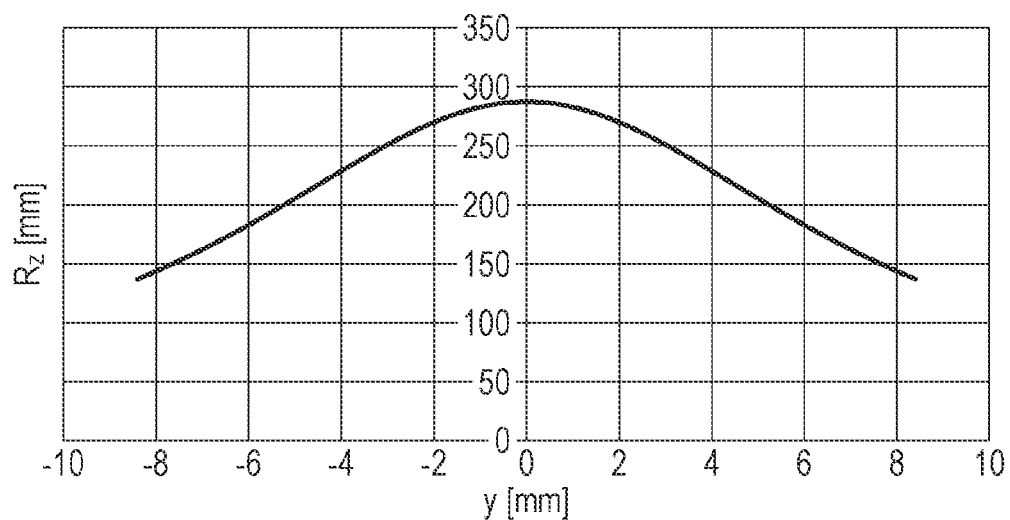
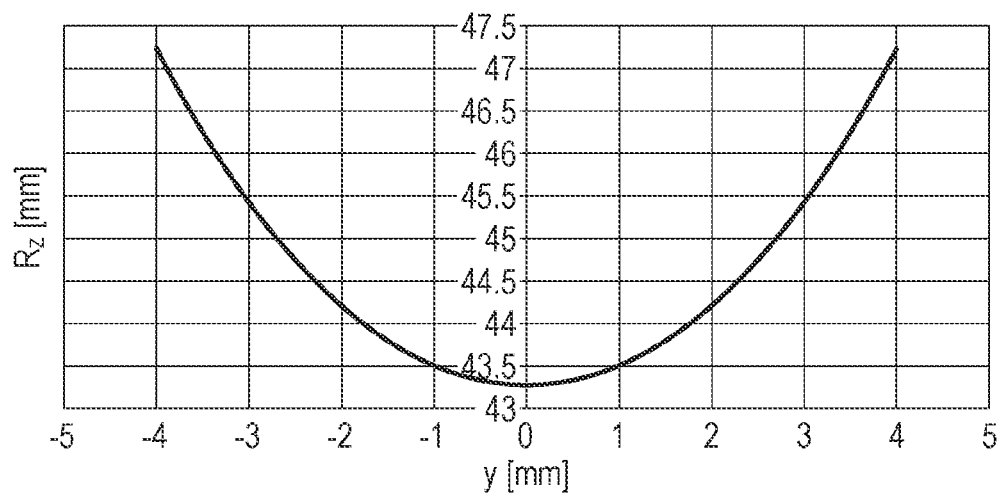

FIG. 8
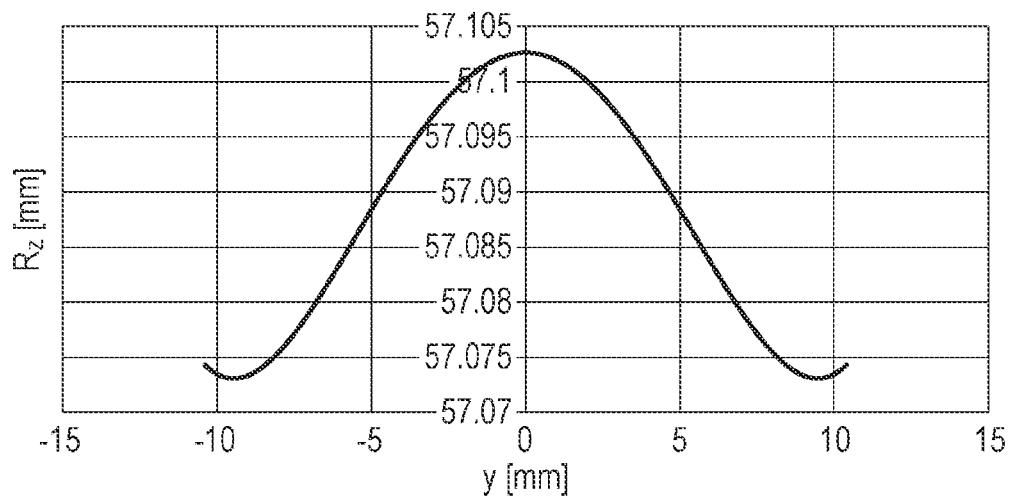
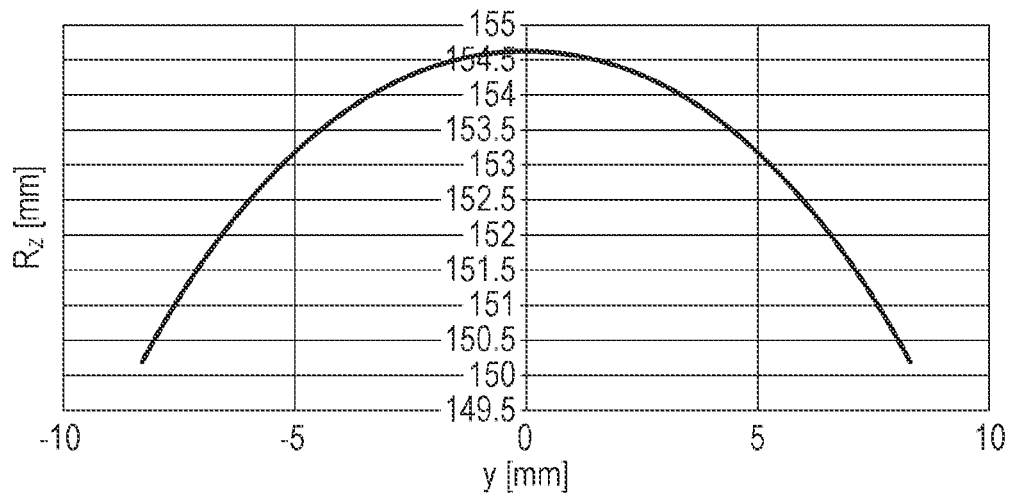

FIG. 10
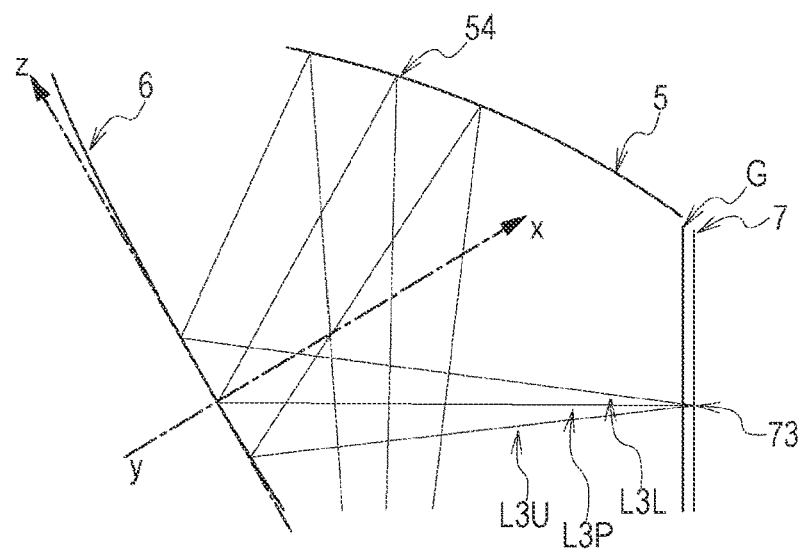
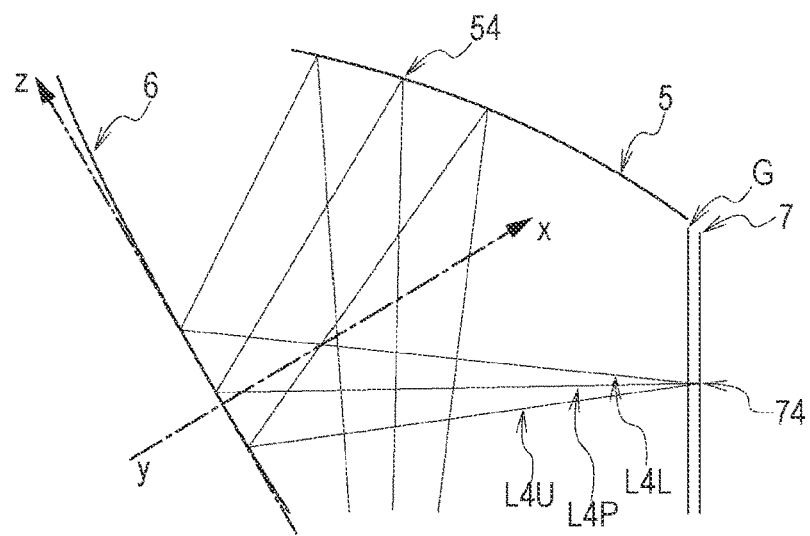
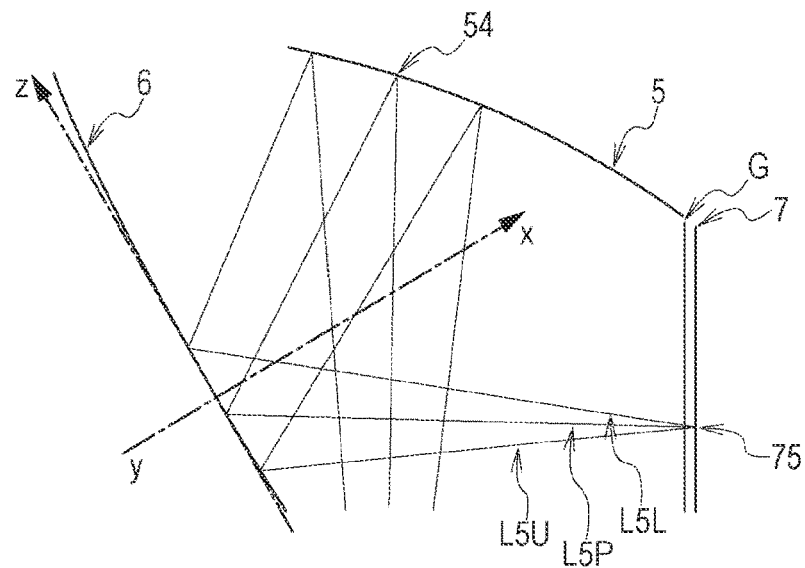

FIG. 11
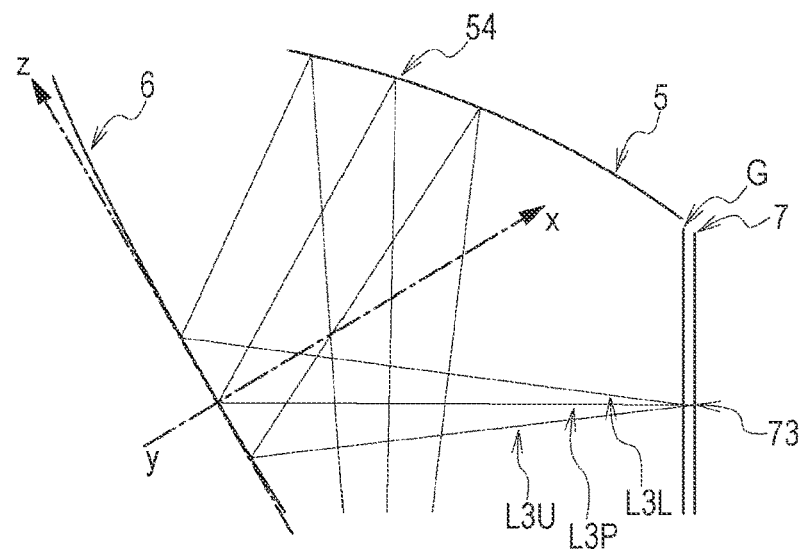
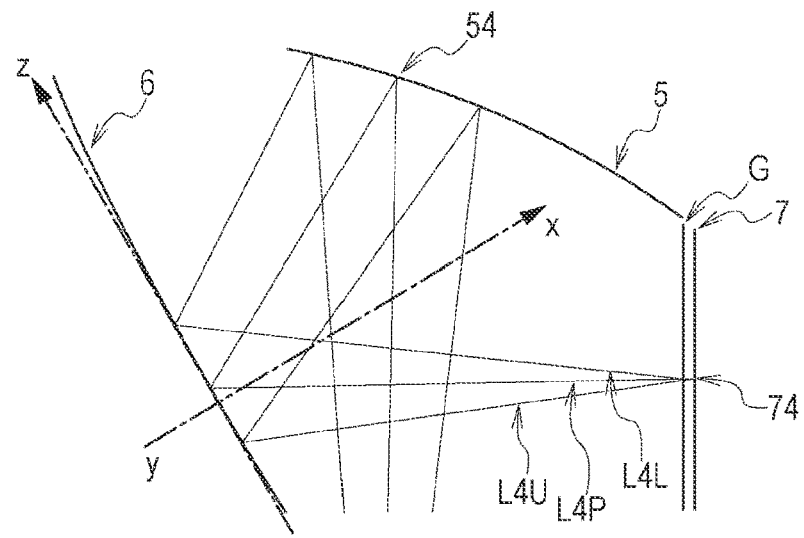
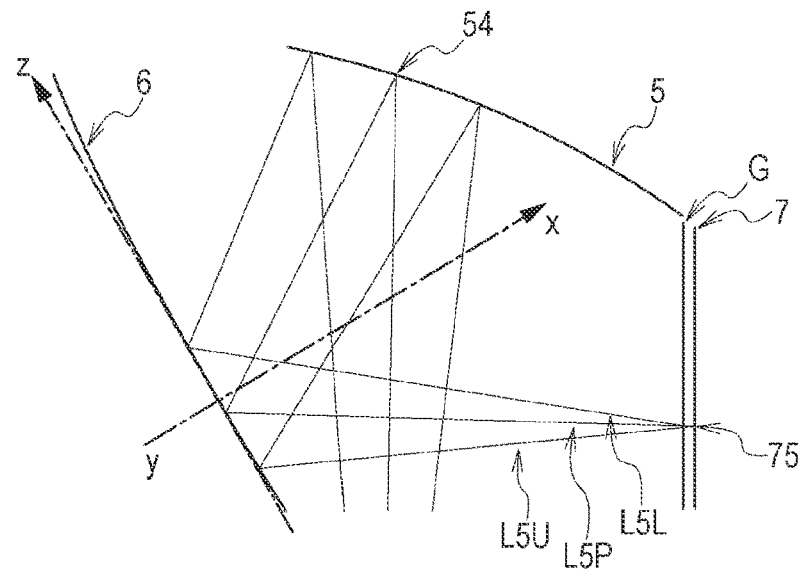

FIG. 13
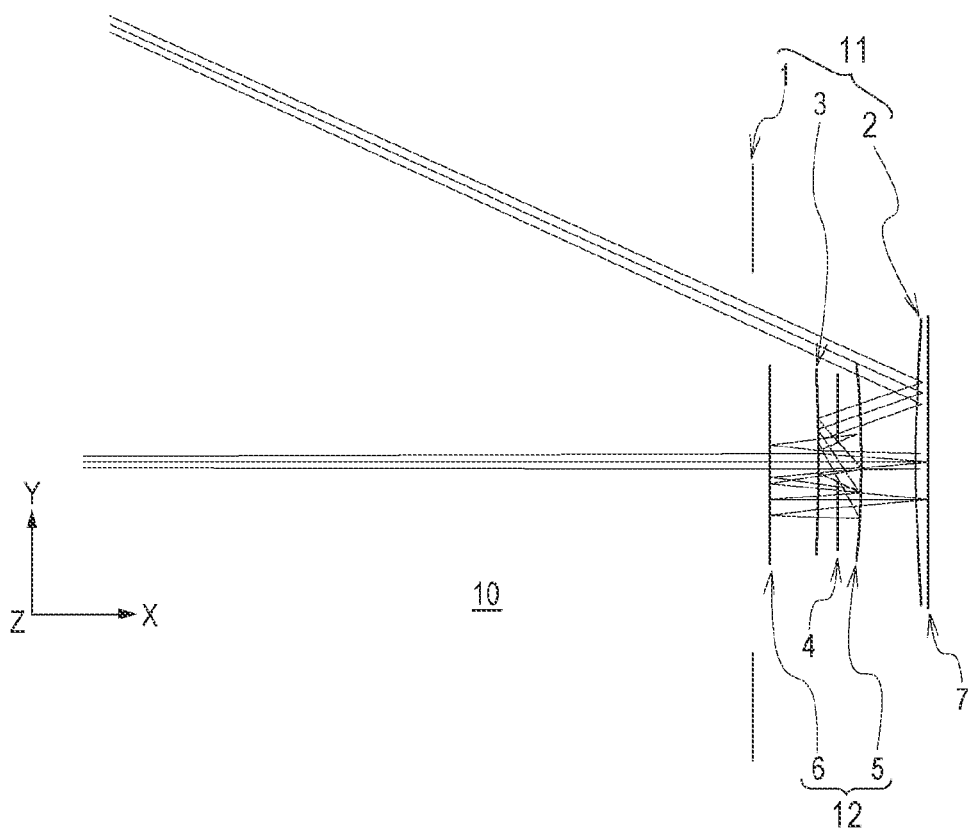
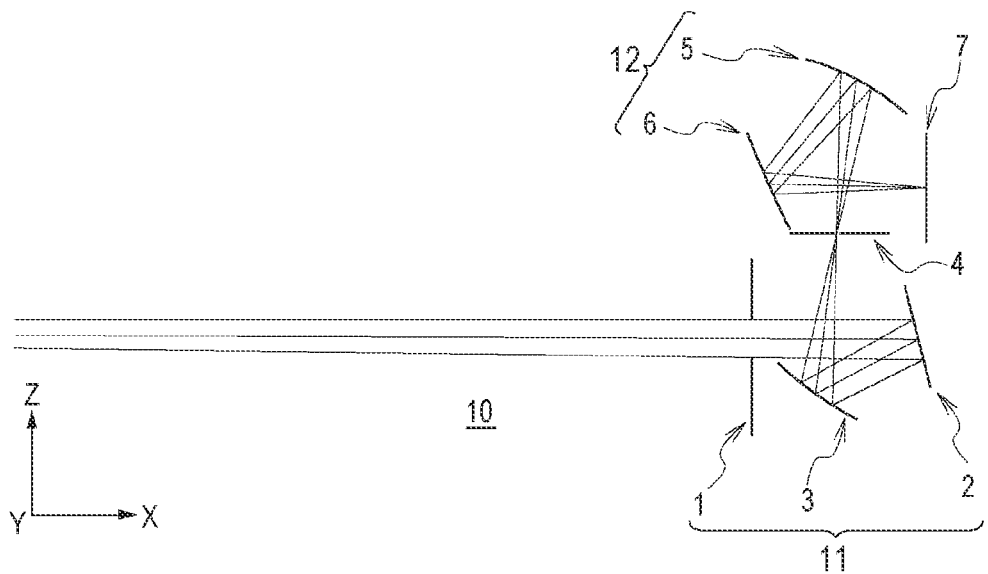

FIG. 15
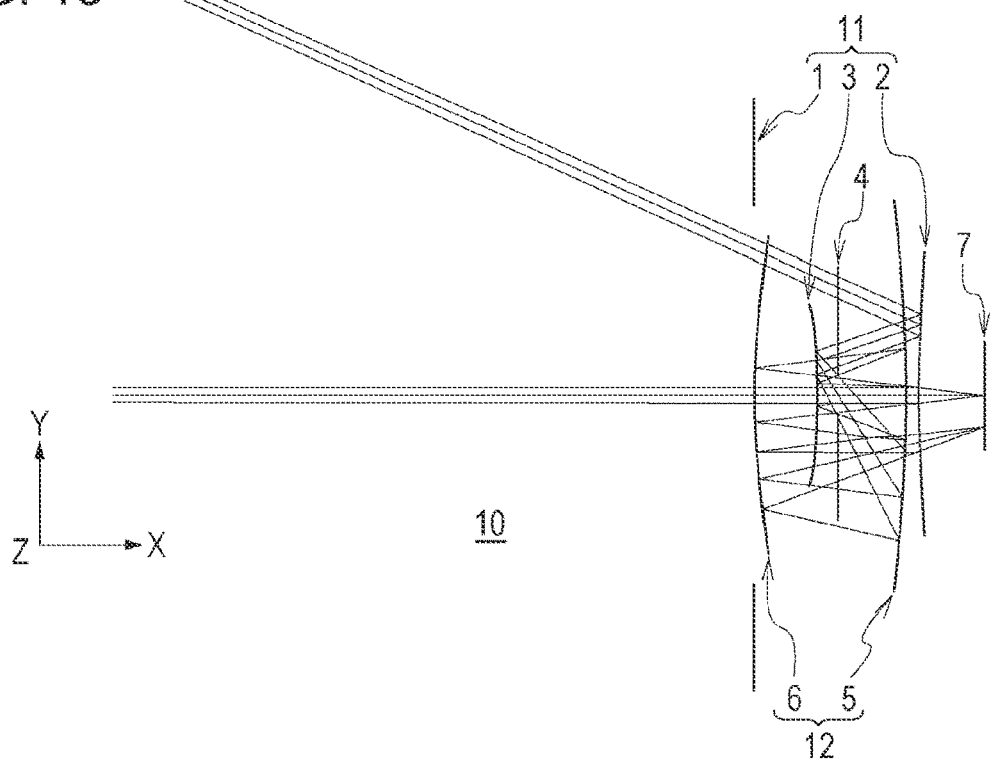
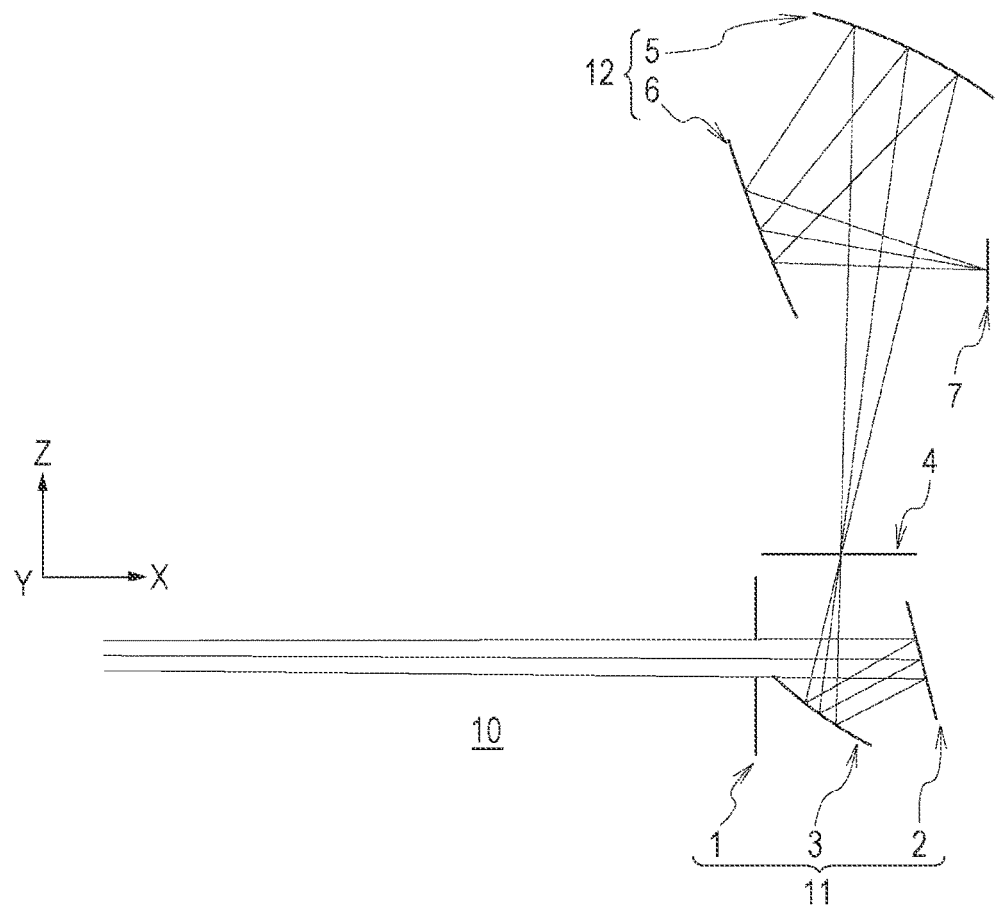

FIG. 17
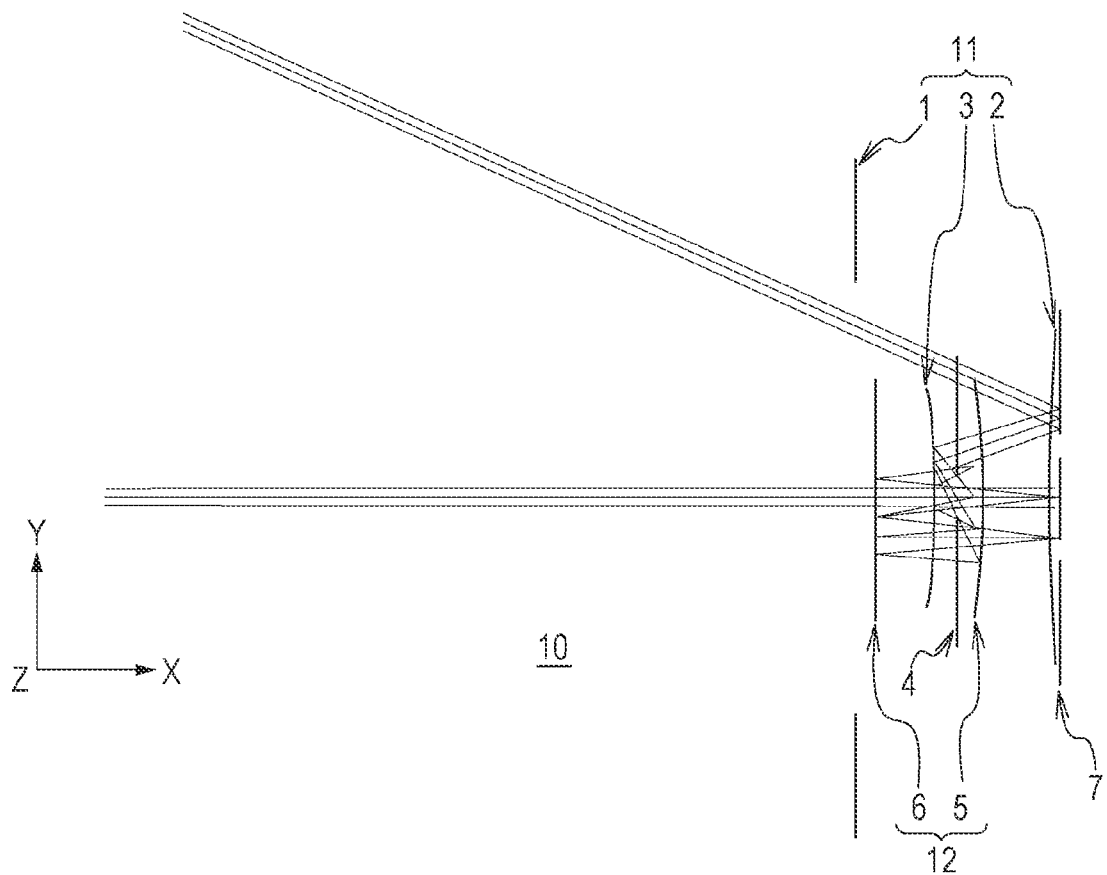
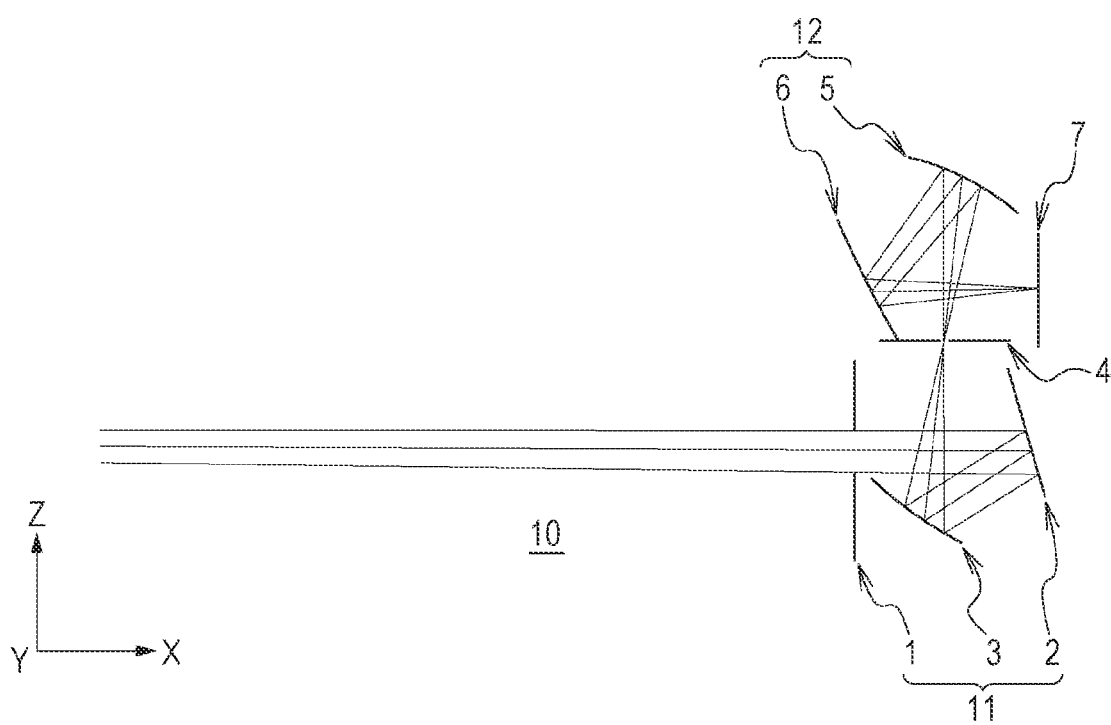

OPTICAL SYSTEM, AND IMAGING APPARATUS AND IMAGING SYSTEM INCLUDING THE SAME

CROSS-REFERENCE TO RELATED APPLICATIONS

This application is a Continuation of International Patent Application No. PCT/JP2019/021340, filed May 29, 2019, which claims the benefit of Japanese Patent Application No. 2018-109858, No. 2018-109857, No. 2018-109859, No. 2018-109860, No. 2018-109861, No. 2018-109862, and No. 2018-109863 filed Jun. 7, 2018, and No. 2019-044279 filed Mar. 11, 2019, all of which are hereby incorporated by reference herein in their entirety.

BACKGROUND OF THE INVENTION

Field of the Invention

The present invention relates to an optical system for use in an imaging apparatus that splits a light beam from an object and that obtains image information and is suitable for inspection and evaluation in industrial fields such as manufacturing industry, agricultural industry, and medical industry.

Background Art

A known optical system splits a light beam from a test object (object) into light beams at different wavelengths and focuses the light beams on different locations. U.S. Pat. No. 7,199,877 discloses an optical system that focuses a light beam from an object at a slit that is elongated in one direction by using a cylindrical mirror and subsequently splits the light beam by using a diffraction grating.

To increase the angle of view of the optical system disclosed in U.S. Pat. No. 7,199,877 in a section along the longitudinal direction of the slit, it can be thought that the cylindrical mirror has curvature (power) in the section.

If the cylindrical mirror has curvature in the section along the longitudinal direction of the slit, however, the locus of the light beam that is reflected by the cylindrical mirror curves in the transverse direction of the slit. For this reason, there is a possibility that a part of the light beam does not passes through the slit but is reflected.

SUMMARY OF THE INVENTION

The present invention provides an optical system that can inhibit the locus of a light beam from curving with respect to a slit and an imaging apparatus and an imaging system that include the optical system.

One of aspects of the present invention provides an optical system including a front group, a light-shielding member, and a rear group that are arranged in this order in a direction from a side of an object toward a side of an image. The light-shielding member is provided with an opening elongated in a first direction. The front group has an aspherical surface, does not image the object at the opening in a first section parallel to the first direction, and forms an intermediate image of the object at the opening in a second section perpendicular to the first direction. The rear group has a diffractive surface that splits a light beam that passes through the opening into light beams at different wavelengths in the second section and focuses the light beams on different locations in the second section. A tilt angle of the aspherical surface in the second section changes in the first direction.

Further features of the present invention will become apparent from the following description of exemplary embodiments with reference to the attached drawings.

BRIEF DESCRIPTION OF THE DRAWINGS

FIG. 3 schematically illustrates principal parts of a diffractive optical element according to the embodiment.

FIG. 4 schematically illustrates an effect due to a tilt change surface.

FIG. 5 illustrates a tilt amount of the tilt change surface and changes in tilt according to the embodiment.

FIG. 7 illustrates the radii of curvature of first and second reflection surfaces in a second section according to the embodiment.

FIG. 8 illustrates the radii of curvature of third and fourth reflection surfaces in the second section according to the embodiment.

FIG. 10 illustrates states of focus of light beams at different wavelengths according to the embodiment.

FIG. 11 illustrates states of focus of light beams at different wavelengths in a comparative example.

FIG. 13 schematically illustrates principal parts of an optical system in example 2.

FIG. 15 schematically illustrates principal parts of an optical system in example 3.

FIG. 17 schematically illustrates principal parts of an optical system in example 4.

DESCRIPTION OF THE EMBODIMENTS

Figure 1:
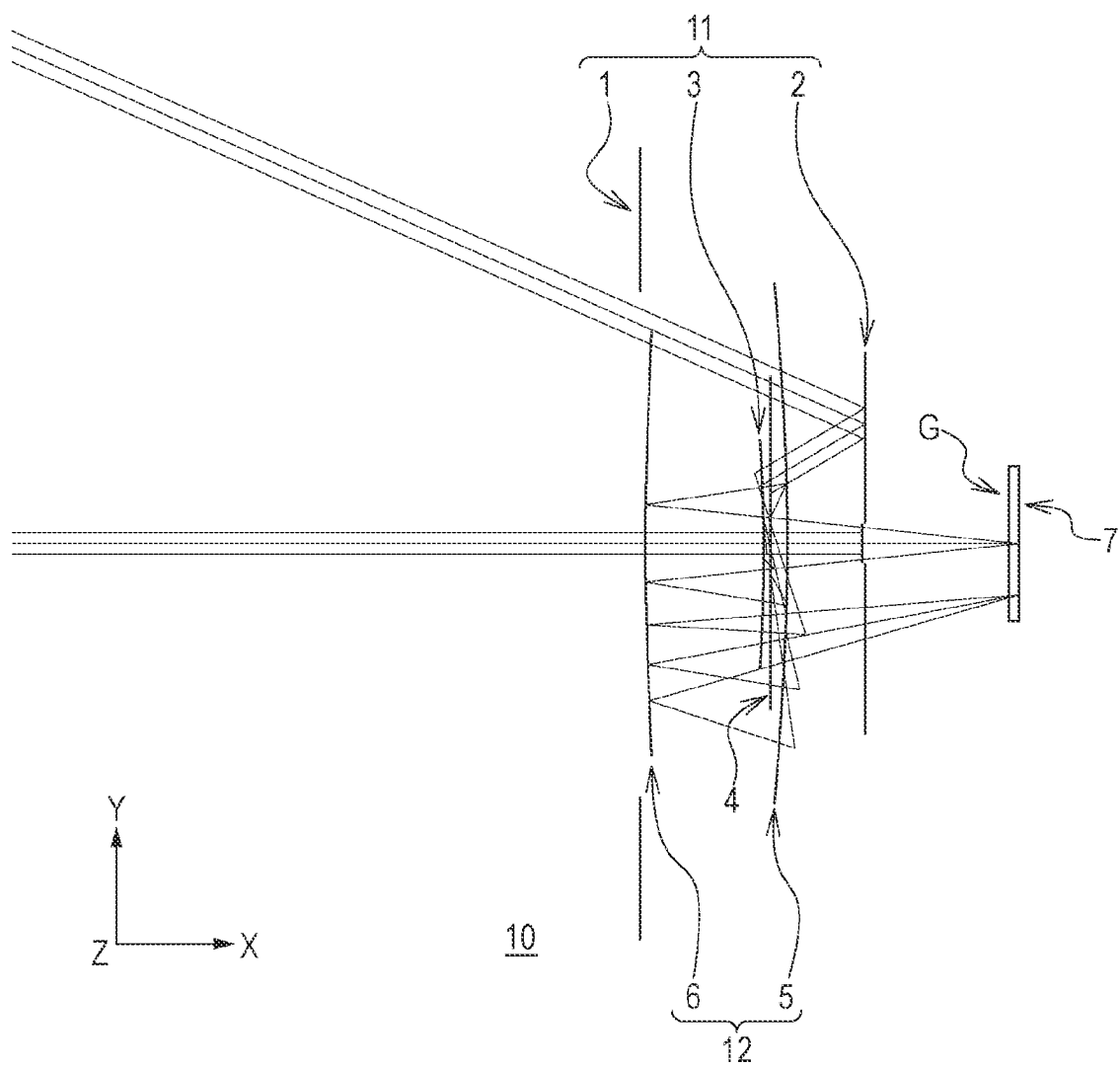
FIG. 1 schematically illustrates principal parts of an optical system according to an embodiment in an XY section.

A preferred embodiment of the present invention will hereinafter be described with reference to the drawings. For convenience, the drawings are made on scales that differ from actual scales. In the drawings, like components are designated by like reference signs, and a duplicated description is omitted.

In the following description, an XYZ coordinate system is defined as an absolute coordinate system, and an xyz coordinate system is defined as a local coordinate system for every optical surface. In the local coordinate system, an x-axis is an axis (an optical axis) in the direction of a normal at a vertex (the origin) of each of optical surfaces, a y-axis is an axis parallel to a Y-axis and perpendicular to the x-axis at the origin, and a z-axis is an axis perpendicular to the x-axis and the y-axis. A Y-direction and a y-direction are also referred to as a first direction (a readout direction), a Z-direction and a z-direction are also referred to as a second direction (a spectral direction), an XY section and an xy section are also referred to as a first section (a readout section), and a ZX section and a zx section are also referred to a second section (a spectral section).

Figure 2:
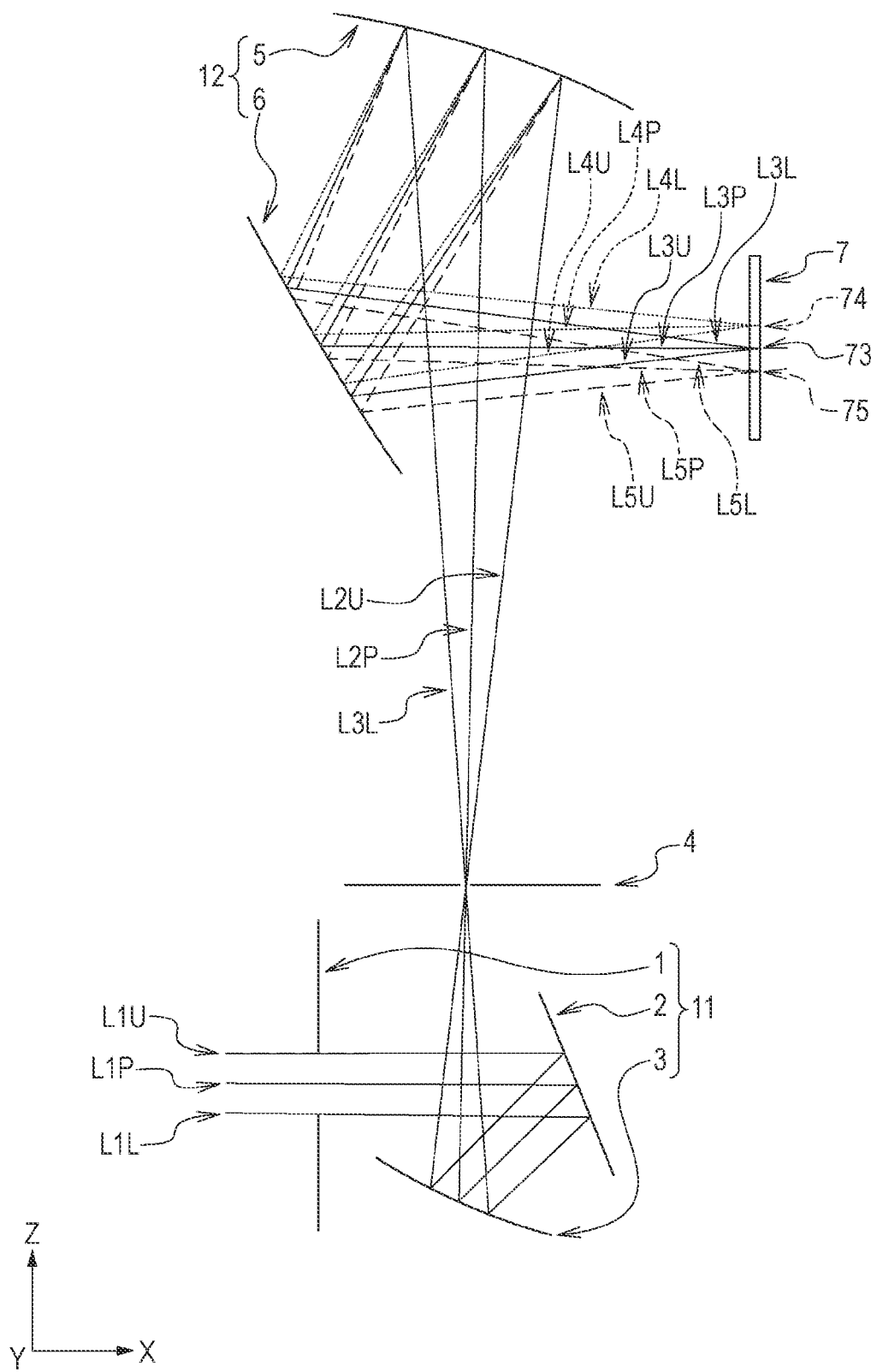
FIG. 2 schematically illustrates the principal parts of the optical system according to the embodiment in a ZX section.

FIG. 1 and FIG. 2 schematically illustrate principal parts of an optical system 10 according to the embodiment of the present invention, FIG. 1 illustrates the first section, and FIG. 2 illustrates the second section. In FIG. 1 and FIG. 2, shapes in sections along optical axes of components are illustrated. For convenience, FIG. 1 illustrates the components on the same paper. In FIG. 1 and FIG. 2, for convenience, diffraction gratings on a diffractive surface are omitted. According to the present embodiment, a test object is disposed near a position of Z=0 on an object surface parallel to a YZ plane, and a light-receiving surface 7 of an imaging element is disposed on an imaging surface of the optical system 10. The test object is illuminated with white light such as sunlight (light that has wavelength components).

The optical system 10 according to the present embodiment includes a front group 11, a light-shielding member (a slit member) 4, and a rear group 12 that are arranged in this order in a direction from a side of an object to a side of an image. The optical system 10 forms an image of the test object on the light-receiving surface (the imaging surface) 7 by focusing a light beam from the test object, not illustrated, which is located in a −X region. The front group 11 has an aperture stop 1, a first reflection surface 2, and a second reflection surface 3. The rear group 12 has a third reflection surface (a diffractive surface) 5 and a fourth reflection surface 6. There is cover glass G just in front of the light-receiving surface 7, but this is dealt with as material that does not contribute to imaging.

The aperture stop 1 is a member that restricts the width of the light beam from the test object in the second direction and is disposed such that an opening surface thereof is perpendicular to an X-direction. However, the aperture stop 1 may be provided outside the optical system 10. In the optical system 10, as illustrated in FIG. 1 and FIG. 2, an entrance port (the aperture stop 1) and an exit port (the light-receiving surface 7) for the light beam are preferably located opposite sides each other with the optical surfaces interposed therebetween. This makes it easy to prevent the light beam from the test object from being shielded by, for example, the imaging element or a wiring line when the optical system 10 is used in an imaging apparatus.

The light-shielding member 4 is provided with an opening (a slit) elongated in the first direction. The light-shielding member 4 limits the angle of view of the optical system 10 in the second section to shield spurious light and serves as an aperture stop that restricts the width of the light beam in the first direction. The width of the opening of the light-shielding member 4 is determined depending on the required amount of light and resolution. The width of the opening of the light-shielding member 4 in the second direction is less than a width (several mm) in the first direction and is preferably several μm to several 100 μm. As for the width of the opening of the light-shielding member 4 in the second direction, when the opening is too thick, the resolution of the light-receiving surface 7 decreases, and when the opening is too thin, an effective light beam that contributes to imaging is likely to be shielded. Accordingly, the width is more preferably no less than 10 μm and no more than 0.2 mm.

Regions of the aperture stop 1 and the light-shielding member 4 other than the opening correspond to light-shielding surfaces through which light at least in a wavelength band that is used (a designed wavelength band) in the optical system 10 does not passes. A metal plate that has a hole or a glass plate on which chromium is deposited can be used as the aperture stop 1 or the light-shielding member 4. The use of the light-shielding member 4 enables the optical system 10 to form an image of a readout region (a test region) in the form of a line elongated in the first direction.

The first reflection surface 2, the second reflection surface 3, and the fourth reflection surface 6 are reflection surfaces that are obtained by forming reflection coatings on base surfaces that have a free-form surface shape. Each of the base surfaces of the reflection surfaces is formed by processing (such as cutting, polishing, or molding with a mold) a block material composed of glass, resin, or metal. The reflection coatings preferably have spectral reflection properties that achieve sufficient energy efficiency (light use efficiency) at the wavelength band that is used. In the case where the base surfaces have sufficient reflectance at the wavelength band that is used, the reflection coatings may be omitted.

According to the present embodiment, the first reflection surface 2, the second reflection surface 3, and the fourth reflection surface 6 are aspherical surfaces and are specifically anamorphic optical surfaces (anamorphic reflection surfaces) that have different degrees of curvature (power) between the first section and the second section. This enables different optical effects to be exerted in the first section and in the second section. In particular, the first reflection surface 2 and the second reflection surface 3 are tilt change surfaces that have a tilt angle (a tilt amount) in the second section that changes in the first direction. Consequently, positions at which an on-axis principal ray and outermost off-axis principal rays enter the light-shielding member 4 can get closer to each other in the second direction, and the light beam can be inhibited from curving at the opening (which will be described in detail later). The tilt angle described herein represents the angle of a normal at the vertex of each reflection surface in the zx section with respect to the x-axis (the xy section).

Provided that the front group 11 has at least one tilt change surface, the first reflection surface 2 or the second reflection surface 3, for example, may be a spherical surface or an anamorphic reflection surface, which is not a tilt change surface, or any one of them may be removed. To readily achieve the effects of the present invention, however, both of the first reflection surface 2 and the second reflection surface 3 are preferably tilt change surfaces.

Provided that the rear group 12 has at least one diffractive surface, and the base surface of the diffractive surface 5, for example, is an anamorphic surface, the fourth reflection surface 6 may be a spherical surface or may be removed. To correct different degrees of comatic aberration at respective wavelengths due to the diffractive surface 5 successfully, the rear group 12 preferably has an optical surface in addition to the diffractive surface 5, and an anamorphic optical surface is preferably located at a position nearer than the diffractive surface 5 to the image as in the present embodiment. If the front group 11 has the diffractive surface 5, then only light beams at specific wavelengths can pass through the opening of the light-shielding member 4. Accordingly, it is necessary for the rear group 12 to have the diffractive surface 5.

To inhibit aberration from occurring in the optical system 10 in a manner in which the optical surfaces share power, all of the optical surfaces of the front group 11 and the rear group 12 are preferably anamorphic optical surfaces. The structures of the front group 11 and the rear group 12 are not limited to the above description, and the optical surfaces of the groups may be increased or decreased in number. To decrease the size of the entire system and the number of components, the front group 11 and the rear group 12 preferably have respective two reflection surfaces as in the present embodiment.

According to the present embodiment, the size of the optical system 10 is decreased by bending an optical path with the result that all of the optical surfaces are reflection surfaces, and chromatic aberration is inhibited from occurring. To decrease the size of the optical system 10 in this case, as illustrated in FIG. 2, the reflection surfaces are preferably located such that the optical path itself intersects (has a shape of a character of "4") in the front group 11 and in the rear group 12. A prism or an internal reflection mirror may be used as a reflection member that has a reflection surface as needed. To inhibit the chromatic aberration from occurring as described above, however, the reflection member is preferably an external reflection mirror such that the reflection surface is exposed to air. The embodiment may be configured such that at least one optical surface may be a refractive surface (transmissive surface) as needed.

In particular, in the rear group 12, a holding member and a wiring line, not illustrated, are disposed around the light-shielding member 4 and the light-receiving surface 7, and it is difficult to ensure enough space for disposing refractive optical elements. Even through enough space is ensured, it is necessary for the refractive optical elements to be disposed to correct the chromatic aberration successfully, and the size of the entire system increases. Accordingly, at least all of the optical surfaces of the rear group 12 are preferably reflection surfaces. Moreover, it is more preferable that all of the optical surfaces of the front group 11 be reflection surfaces.

FIG. 3 schematically illustrates principal parts of a diffractive optical element (a reflective optical element) 50 that has the diffractive surface 5 according to the present embodiment and illustrates a perspective diagram and a front diagram (diagrams viewed in a +x direction). The diffractive surface 5 has a base surface 51 and diffraction gratings 52 that are disposed on the base surface 51. For convenience, FIG. 3 illustrates an enlarged part of the diffraction gratings 52.

The base surface 51 of the diffractive surface 5 has a free-form surface shape as in the other reflection surfaces. The diffraction gratings 52 include gratings (projections) that are arranged at a pitch in the order of a submicron to a micron, and the heights of the gratings are in the order of a submicron to a micron. The diffraction gratings 52 can be diffraction gratings a zx section of which has a stair shape, an uneven rectangle shape, a blaze shape, or a SIN wave shape. The shapes of the diffraction gratings 52 are selected in consideration for required diffraction efficiency and ease of manufacturing.

According to the present embodiment, the blaze shape is used because the blaze shape enables both of improvement in the diffraction efficiency and the ease of manufacturing to be relatively readily achieved. As for the diffraction gratings that have the blaze shape, a portion farthest from the base surface 51 in the x direction is referred to as a grating vertex, a portion that reflects (diffracts) incident light is referred to as a blaze surface (a grating surface), and a portion that is adjacent to the blaze surface and that does not contribute to diffraction is referred to as a grating wall surface. As for the diffractive surface 5 according to the present embodiment, the blaze surface faces the light-receiving surface 7 (the image), and the grating wall surface faces the object. Consequently, a light beam at a short wavelength enters the light-receiving surface 7 in a +Z region in FIG. 2, and a light beam at a long wavelength enters the light-receiving surface 7 in a −Z region.

The base surface 51 is formed in the same manner as the other reflection surfaces described above. The diffraction gratings 52 can be formed by processing the base surface 51 by cutting or polishing. However, the diffraction gratings 52 may be formed at the same time the base surface 51 is formed. For example, the diffractive optical element 50 that has the diffraction gratings 52 may be manufactured in a manner in which a fine irregular structure is formed on a surface of a mirror surface part of a mold, and molding is performed by using the mold. A reflection coating may be formed on a surface of each diffraction grating 52 to improve the diffraction efficiency.

As illustrated in FIG. 3, the diffraction gratings 52 are preferably formed such that ridge lines corresponding to vertices of the gratings in the zx section are parallel to each other. The distances between the ridge lines of the diffraction gratings 52 are more preferably constant. This makes it easy to process the base surface 51 by cutting or polishing. The embodiment may be configured such that distances between the ridge lines are not be constant, if necessary. For example, to achieve a high degree of aberration correction in the optical system 10, the distances between the ridge lines may be changed in the z-direction.

It is preferable that the base surface 51 of the diffractive surface 5 be an aspherical surface as in the other reflection surfaces and specifically an anamorphic surface that has different degrees of curvature in the xy section and in the zx section. This enables the power to be shared together with the other anamorphic optical surfaces, and the aberration is readily corrected. According to the present embodiment, the base surface 51 of the diffractive surface 5 is an anamorphic surface. However, the base surface 51 may be a flat surface or a spherical surface to regard the ease of manufacturing of the diffraction gratings 52 as important.

The effects of the optical system 10 will be described with reference to FIG. 1 and FIG. 2.

A light beam that is emitted from the test object passes through the opening of the aperture stop 1, is subsequently reflected from the first reflection surface 2 and the second reflection surface 3 and reaches the light-shielding member 4. At this time, the front group 11 does not image the test object at the opening of the light-shielding member 4 in the first section (the XY section) but forms an intermediate image of the test object at the opening of the light-shielding member 4 in the second section (the ZX section). That is, in the front group 11, the position of focus does not coincide with the object surface in the first section. Consequently, the intermediate image (a line image) in the form of a line elongated in the first direction is formed at the opening of the light-shielding member 4. The meaning of "at the opening" described herein is not limited to the precise position of the opening but includes a position near the opening and slightly away from the opening in the optical axis (substantially at the opening).

The light beam that passes through the opening of the light-shielding member 4 is split into light beams at different wavelengths by using the diffractive surface 5 in the second section. At this time, the light beam that enters the diffractive surface 5 is subjected to a spectral effect only in the z-direction and is not subjected to the spectral effect in the y-direction, because the diffraction gratings on the diffractive surface 5 include the gratings (the ridge lines) that are arranged in the z-direction. The light beams from the diffractive surface 5 are reflected from the fourth reflection surface 6 and enter the light-receiving surface 7 that is located on the imaging surface. At this time, the light beams at the different wavelengths are focused on different locations on the light-receiving surface 7 in the second section. That is, the optical system 10 according to the present embodiment enables images for the respective wavelengths to be formed on the light-receiving surface 7, and the light-receiving surface 7 enables image information for the respective wavelengths to be obtained.

The optical system 10 according to the present embodiment thus exerts different optical effects in the first section along the readout direction and in the second section along the spectral direction. Specifically, in the first section, the test object is not imaged at the opening of the light-shielding member 4 once but is imaged on the light-receiving surface 7, and in the second section, the test object is imaged at the opening of the light-shielding member 4 once and reimaged on the light-receiving surface 7 again. That is, in the first section, the test object is imaged once, but in the second section, the test object is imaged twice.

With this structure, the convergence of the light beam (the light beam that enters the opening) that passes through the opening of the light-shielding member 4 is not limited in the first section, and the degree of freedom of design of the optical system 10 can be increased. Accordingly, the test object can be imaged on the light-receiving surface 7 by sharing the power appropriately by the front group 11 and the rear group 12, and various kinds of aberration is readily corrected. Accordingly, the angle of view can be increased (the readout region can be widened) and an imaged image can be precise.

Specifically, in the front group 11, the position of focus in the first section does not coincide with the object surface, and the light beam that passes through the opening of the light-shielding member 4 can be that of non-parallel light. This enables the angle of view in the first section to be readily increased. If the light beam that passes through the opening of the light-shielding member 4 is that of parallel light, then the rear group 12 needs to include a large number of optical elements to increase the angle of view of the optical system 10, and the size of the entire system increases. According to the present embodiment, the light beam that passes through the opening of the light-shielding member 4 is diverging light to increase the angle of view. The embodiment may be configured such that the light beam that passes through the opening of the light-shielding member 4 is converging light as needed.

In the case where the test object is imaged at the opening of the light-shielding member 4 once also in the first section, the front group 11 and the rear group 12 need to correct the aberration individually. Accordingly, the degree of freedom of design of the optical surface decreases, for example, the power of each optical surface needs to be increased, and it is difficult to increase the angle of view of the optical system 10. It is not necessary to increase the angle of view in the second section, and NA can be increased by imaging the test object at the opening of the light-shielding member 4 once.

With the structure described above, the power of the front group 11 and the power of the rear group 12 differ between the first section and the second section. For this structure, the front group 11 and the rear group 12 need to have respective anamorphic optical surfaces. In this case, it is preferable that power be actively provided to the anamorphic optical surface of the front group 11 not only in the second section, but also in the first section (the absolute value of curvature is more than 0). The sign of the power of the front group 11 and the sign of the power of the rear group 12 more preferably differ from each other in the first section.

Specifically, in the second section, the front group 11 and the rear group 12 need to have positive power in order that the test object is imaged at the opening of the light-shielding member 4 once and is subsequently reimaged on the light-receiving surface 7. In the first section, however, it is not necessary to image the test object at the opening of the light-shielding member 4 once. Accordingly, to further increase the angle of view, the front group 11 preferably has negative power, and the rear group 12 preferably has positive power. Consequently, the optical system 10 is of a retrofocus type in the first section, the focal length of the entire system decreases, and the angle of view can increase. In the case where the test object is sufficiently separated from the optical system 10, however, the optical system 10 may be a telephoto optical system in which the front group 11 has positive power, and the rear group 12 has negative power.

A situation in which a light beam is split by using the diffractive surface 5 will be described with reference to FIG. 2. A case that is considered herein is that a white light beam that is emitted from a single point on the test object is split into light beams at wavelengths λ1 [nm], λ2 [nm], and λ3 [nm] (λ2<λ1<λ3). As for the light beams, FIG. 2 illustrates only principal rays and marginal rays.

A principal ray L1P and marginal rays L1U and L1L of the white light beam that is emitted from the test object form an intermediate image in the form of a line at the opening of the light-shielding member 4 after interfering with the aperture stop 1, the first reflection surface 2, and the second reflection surface 3. A principal ray L2P and marginal rays L2U and L2L that pass through the opening of the light-shielding member 4 are split into rays L3P, L3U, and L3L at the wavelength λ1, rays L4P, L4U, and L4L at the wavelength λ2, and rays L5P, L5U, and L5L at the wavelength λ3 by using the diffractive surface 5. The rays at the wavelength λ1, the wavelength λ2, and the wavelength λ3 are focused on a first location 73, a second location 74, and a third location 75 on the light-receiving surface 7.

The effects and the shapes of the first reflection surface 2 and the second reflection surface 3 will now be described in detail.

FIG. 4 schematically illustrates an effect due to a change in the tilt angle of a reflection surface in the first direction. FIG. 4 illustrates situations in which a principal ray (an on-axis principal ray) 501 of a light beam from an on-axis object point and principal rays (outermost off-axis principal rays) 502 and 503 of light beams from outermost off-axis object points are reflected from reflection surfaces and pass through an opening 401 in the light-shielding member. In the upper part in FIG. 4, a reflection surface 510 having a tilt angle that does not change is illustrated. In the middle part in FIG. 4, a reflection surface 520 that is obtained by changing the tilt angle of a flat reflection surface is illustrated. In the lower part in FIG. 4, a reflection surface 530 that is obtained by changing the tilt angle of the reflection surface 510 in the upper part in FIG. 4 in the same manner as in the reflection surface 520 in the middle part in FIG. 4 is illustrated.

As illustrated in the upper part in FIG. 4, the on-axis principal ray 501 of the rays that are reflected from the reflection surface 510 enters the location of the opening 401 of the light-shielding member in the z-direction. The outermost off-axis principal rays 502 and 503 enter locations (the light-shielding surfaces) a shift amount 511 away from the opening 401 of the light-shielding member. In the case where the reflection surface 510 is not a tilt change surface as above, positions at which the principal rays that are reflected from the reflection surface 510 enter the light-shielding member greatly differ between the on-axis principal ray and the outermost off-axis principal rays. Consequently, a locus 512 of the light beams from the test object greatly curves in the z-direction, and the light beams from the off-axis object points cannot pass through the opening 401.

In the case where the reflection surface is a flat surface, the locus of the light beams that are reflected from the flat reflection surface does not curve in the z-direction, the rays in a region from the on-axis object point to the outermost off-axis object points pass through the opening 401. As illustrated in the middle part in FIG. 4, a locus 522 of the light beams from the test object can be intentionally bent so as to curve in the z-direction in a manner in which the tilt angle of a flat reflection surface in the zx section is continuously changed in the y-direction.

As illustrated in the lower part in FIG. 4, the position at which the on-axis principal ray 501 enters the light-shielding member and the positions at which the outermost off-axis principal rays 502 and 503 enter the light-shielding member can get closer to each other in the z-direction in a manner in which the tilt angle of the reflection surface 510 is changed in the same manner as in the reflection surface 520. This enables the shift amount 511 of the outermost off-axis principal rays 502 and 503 with respect to the opening 401 to be decreased and enables a locus 532 of the light beams to substantially coincide with the shape of the opening 401. Accordingly, the use of the tilt change surface prevents parts of the light beams from not being able to pass through the opening 401 and from being shielded by the light-shielding member.

According to the present embodiment, the first reflection surface 2 and the second reflection surface 3 are tilt change surfaces as described above, and the positions at which the on-axis principal ray and the outermost off-axis principal rays enter the opening of the light-shielding member 4 can get closer to each other in the second direction. Consequently, the light beam is inhibited from curving at the opening, and the rays in the region from the on-axis object point to the outermost off-axis object points can pass through the opening. Accordingly, the optical system 10 according to the present embodiment can increase the angle of view by providing the power to the reflection surfaces in the first section and can inhibit optical performance from being degraded with the result that a part of the light beam is shielded by the light-shielding member 4.

FIG. 5 illustrates changes in the tilt angles of the first reflection surface 2 and the second reflection surface 3 according to the present embodiment. In FIG. 5, graphs of solid lines represent the first reflection surface 2, and graphs of dashed lines represent the second reflection surface 3. In the upper part in FIG. 5, the horizontal axis represents a position [mm] in the y-direction with respect to the origin of the local coordinate system of each reflection surface, and the vertical axis represents the tilt angle (the tilt amount) [deg] of each reflection surface. In the lower part in FIG. 5, the horizontal axis represents the position [mm] in the y-direction with respect to the origin of the local coordinate system of each reflection surface, and the vertical axis represents the change in the tilt angle (a change in tilt) [deg/mm] of each reflection surface. The change in tilt corresponds to the first derivative of the tilt amount and is expressed as dT/dy where T is the tilt amount.

As illustrated in the upper part in FIG. 5, the tilt amounts of the first reflection surface 2 and the second reflection surface 3 change in the y-direction, and the changes are symmetric with respect to the z-axis. In this case, as illustrated in the upper part in FIG. 5, the tilt amount of each reflection surface is preferably changed monotonically (continuously) for the ease of manufacturing and the design of the reflection surface. In the case where the tilt amount of each reflection surface does not monotonically change, the reflection surface has an inflection point, the reflection surface is difficult to form, and wavefront aberration is likely to occur near the inflection point.

As illustrated in the lower part in FIG. 5, the changes in the tilts of the first reflection surface 2 and the second reflection surface 3 are close to each other for the same object point. The changes in the tilts in regions of the tilt change surfaces through which the light beam from the same object point passes thus get closer to each other, and the light beam from the same object point can be successfully inhibited from curving. Specifically, a conditional expression (1) described below is preferably satisfied where $|dT_1/dy|$ and $|dT_2/dy|$ are the changes in the tilts in the regions of the first reflection surface 2 and the second reflection surface 3 through which the light beam from the same object point passes.

$$1.00 \leq |dT_1/dy|/|dT_2/dy| \leq 1.50 \quad (1)$$

If the conditional expression (1) exceeds the upper limit, then a difference between the change in the tilt of the first reflection surface 2 and the change in the tilt of the second reflection surface 3 is too large, and it is difficult for the light beam from the same object point to be successfully inhibited from curving. As for the conditional expression (1), the change in the tilt of the first reflection surface 2 is supposed to be equal to or more than the change in the tilt of the second reflection surface 3 ($|dT_1/dy| \leq |dT_2/dy|$). If the change in the tilt of the first reflection surface 2 is less than the change in the tilt of the second reflection surface 3, then it may be read that the change in the tilt of the first reflection surface 2 is $|dT_2/dy|$, and that the change in the tilt of the second reflection surface 3 is $|dT_1/dy|$.

According to the present embodiment, a difference between the tilt amount of the first reflection surface 2 at an on-axis position and the tilt amount at each of outermost off-axis positions is 1 deg, and a difference between the tilt amount of the second reflection surface 3 at the on-axis position and the tilt amount at each outermost off-axis position is 0.4 deg. The changes in the tilts in regions of the first reflection surface 2 and the second reflection surface 3 through which the light beam from each outermost off-axis object point passes are 0.26 deg/mm and 0.20 deg/mm, $|dT_1/dy|/|dT_2/dy|=1.30$ is satisfied, and the conditional expression (1) is satisfied. A conditional expression (1a) described below is more preferably satisfied.

$$1.00 |dT_1/dy|/|dT_2/dy| \leq 1.35 \quad (1a)$$

Figure 6:
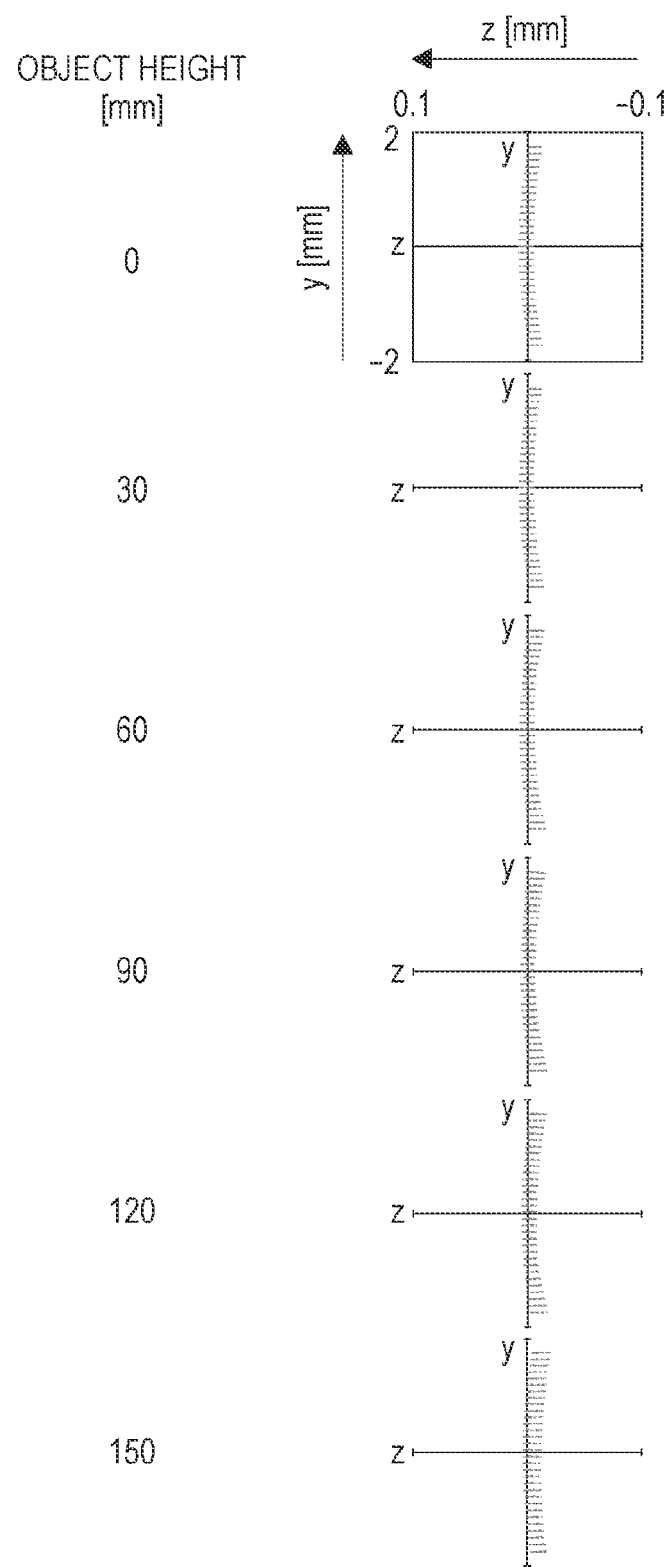
FIG. 6 illustrates a spot diagram at an opening of a light-shielding member according to the embodiment.

FIG. 6 illustrates distribution (a spot diagram) of the light beams from object heights at the opening of the light-shielding member 4 according to the present embodiment. In FIG. 6, the horizontal axis represents a position [mm] in the z-direction (the transverse direction) at the opening of the light-shielding member 4, the vertical axis represents a position [mm] in the y-direction (the longitudinal direction) at the opening of the light-shielding member 4, and points represent intersection points between the opening of the light-shielding member 4 and the rays.

According to the present embodiment, the width of the opening of the light-shielding member 4 in the y-direction is 3.6 mm, and as illustrated in FIG. 6, the light beams at the opening extend to a range of 3.6 mm (±1.8) in the y-direction. It can be seen that the distribution of the light beams is sufficiently inhibited from curving in the z-direction with the result that the first reflection surface 2 and the second reflection surface 3 are tilt change surfaces as described above. In this case, it is understood that the width of the opening of the light-shielding member 4 in the z-direction is 0.05 mm, which is sufficiently larger than the diameters of the light beams, and that the light beams are not shielded by the light-shielding member 4 in the z-direction and entirely pass through the opening.

The optical system 10 according to the present embodiment, in which the front group 11 has the tilt change surfaces, can inhibit the locus of the light beams from curving at the opening of the light-shielding member 4 and can achieve good optical performance even with a simple structure.

The first reflection surface 2, or the second reflection surface 3, or both are preferably secondary-line curvature change surfaces, each of which has the curvature radius in the second section, the curvature radius at the on-axis position in the first direction differing from that at the outermost off-axis positions in the first direction. This enables the curvature of field at the opening of the light-shielding member 4 to be successfully corrected and prevents a part of each light beam from being shielded by the light-shielding surface of the light-shielding member 4. Generally, in the case where the angle of view of the optical system is increased, the curvature of field is generated typically strongly, and the use of the secondary-line curvature change surfaces makes it easy to increase the angle of view. This will now be described in detail.

FIG. 7 illustrates the radii of curvature of the first reflection surface 2 and the second reflection surface 3 of the front group 11 in the second section (the zx section). In FIG. 7, the horizontal axis represents a position [mm] in the y-direction with respect to the origin of the local coordinate system of each reflection surface, and the vertical axis represents the radius $R_z$ [mm] of curvature of each reflection surface in the second section.

As illustrated in FIG. 7, the first reflection surface 2 and the second reflection surface 3 according to the present embodiment are the secondary-line curvature change surfaces, each of which has the curvature radius in the second section, the curvature radius at the on-axis position in the first direction differing from that at the outermost off-axis positions in the first direction. This enables correction of the curvature of field: in the second section, the position of focus of the light beam at the on-axis position in the opening of the light-shielding member 4 shifts from those at the outermost off-axis positions in the direction of the optical axis. This prevents the light beams that are reflected from the second reflection surface 3 at the outermost off-axis positions, for example, from being focused on the front or rear of the opening of the light-shielding member 4 and prevents part thereof from being shielded by the light-shielding surface of the light-shielding member 4.

In this case, as illustrated in FIG. 7, the radii of curvature of the first reflection surface 2 and the second reflection surface 3 preferably change from the on-axis position toward the outermost off-axis positions. This enables the curvature of field in the second section to be successfully corrected over the entire region from the on-axis position to the outermost off-axis positions in the first direction. That is, positions of focus of the light beams in the second section over the entire region from the on-axis position to the outermost off-axis positions can be aligned at the opening of the light-shielding member 4. In this case, as illustrated in FIG. 7, it is preferable that the curvature radius of each reflection surface be monotonically (continuously) changed. If the curvature radius of each reflection surface does not monotonically change, then the reflection surface has the inflection point, the reflection surface is difficult to form, and the wavefront aberration is likely to occur near the inflection point.

To correct the curvature of field at the opening of the light-shielding member 4, the curvature radius at the on-axis position is differentiated from the curvature radius at least at one of the outermost off-axis positions. To correct the curvature of field more successfully, the curvature radius at the on-axis position is preferably differentiated from the radii of curvature at the two outermost off-axis positions (of both ends) as in the present embodiment. In this case, a relationship (the direction of change) in magnitude between the curvature radius at the on-axis position and the curvature radius at one of the outermost off-axis positions is preferably the same as a relationship in magnitude between the curvature radius at the on-axis position and the curvature radius at the other outermost off-axis position. That is, the radii of curvature at both of the outermost off-axis positions are preferably larger than the curvature radius at the on-axis position, or the radii of curvature at both of the outermost off-axis positions are preferably smaller than the curvature radius at the on-axis position.

Provided that the front group 11 has at least one secondary-line curvature change surface, the first reflection surface 2 or the second reflection surface 3, for example, may be a spherical surface or an anamorphic optical surface, which is not a secondary-line curvature change surface, or any one of them may be removed. In particular, the optical surface of the front group 11 that has the smallest curvature radius (the maximum power) in the second section is preferably the secondary-line curvature change surface. According to the present embodiment, the curvature radius of the second reflection surface 3 is smaller than the curvature radius of the first reflection surface 2, and the curvature of field can be readily corrected when at least the second reflection surface 3 is the secondary-line curvature change surface. To readily obtain the effects of the present invention, however, both of the first reflection surface 2 and the second reflection surface 3 are preferably the secondary-line curvature change surfaces.

In the case where the secondary-line curvature change surfaces are provided, the change in the curvature radius is preferably determined depending on the magnitude of the curvature radius of each reflection surface. According to the present embodiment, as illustrated in FIG. 7, the change in the curvature radius of the second reflection surface 3 that has a small curvature radius is smaller than the change in the curvature radius of the first reflection surface 2 that has a large curvature radius. The curvature radius of the first reflection surface 2 in the second section decreases in a direction from the on-axis position toward each outermost off-axis position, and the curvature radius of the second reflection surface 3 increases in a direction from the on-axis position toward each outermost off-axis position. The positions of focus of the light beams from the second reflection surface 3 in the second section can substantially coincide with positions in the opening of the light-shielding member 4 over the entire region from the on-axis position to the outermost off-axis positions in the first direction. A method of changing the curvature radius of each reflection surface is not limited to that described according to the present embodiment and is preferably determined depending on the design of the entire optical system.

FIG. 8 illustrates the radii of curvature of the base surface of the third reflection surface 5 and the fourth reflection surface 6 of the rear group 12 in the second section as in FIG. 7. As illustrated in FIG. 8, the front group 11 and the rear group 12 have the secondary-line curvature change surfaces, and the curvature of field on the light-receiving surface 7 in the second section can be corrected. According to the present embodiment, as illustrated in FIG. 8, the radii of curvature of the third reflection surface 5 and the fourth reflection surface 6 are changed so as to decrease in a direction from the on-axis position to each outermost off-axis position.

As illustrated in FIG. 8, the curvature radius of the base surface of the third reflection surface 5 increases near each outermost off-axis position, but this portion does not contribute to imaging (a non-effective region). That is, the curvature radius of a portion of the base surface of the third reflection surface 5 that contributes to imaging (an effective region) monotonically decreases in the direction from the on-axis position to each outermost off-axis position. The method of changing the curvature radius of each reflection surface is not limited to that described according to the present embodiment as in the front group 11 and is preferably determined depending on the design of the entire optical system.

According to the present embodiment, as illustrated in FIG. 8, the curvature radius of the base surface of the third reflection surface 5 at the on-axis position is differentiated from that at the outermost off-axis positions, and the power (the refractive power) of the third reflection surface 5 due to refraction at the on-axis position is differentiated from that at the outermost off-axis positions. The power (the diffractive power) of the third reflection surface 5 due to diffraction at the on-axis position is preferably the same as that at the outermost off-axis positions. In the case where the diffractive power at the on-axis position differs from that at the outermost off-axis positions, spectral performance at the on-axis position differs from that at the outermost off-axis positions, and there is a possibility that good spectral information (image information) is not obtained. According to the present embodiment, the diffraction gratings on the third reflection surface 5 include the gratings (the ridge lines) that are arranged in the z-direction as described above, and the diffractive power at the on-axis position is consequently the same as that at the outermost off-axis positions. However, the meaning of the "same" described herein includes not only precisely the same but also substantially the same.

In an optical system disclosed in U.S. Pat. No. 7,199,877 described above, the incident angles of light beams with respect to a lens differ from each other, and this causes the different degrees of comatic aberration at the respective wavelengths. To correct the different degrees of comatic aberration at the respective wavelengths, it is necessary to use a large number of lenses, and the structure of the optical system is complex. Accordingly, the shape of the fourth reflection surface 6 is preferably devised to provide the optical system that corrects the different degrees of comatic aberration at the respective wavelengths with a simple structure. This will be described in detail.

Figure 9:
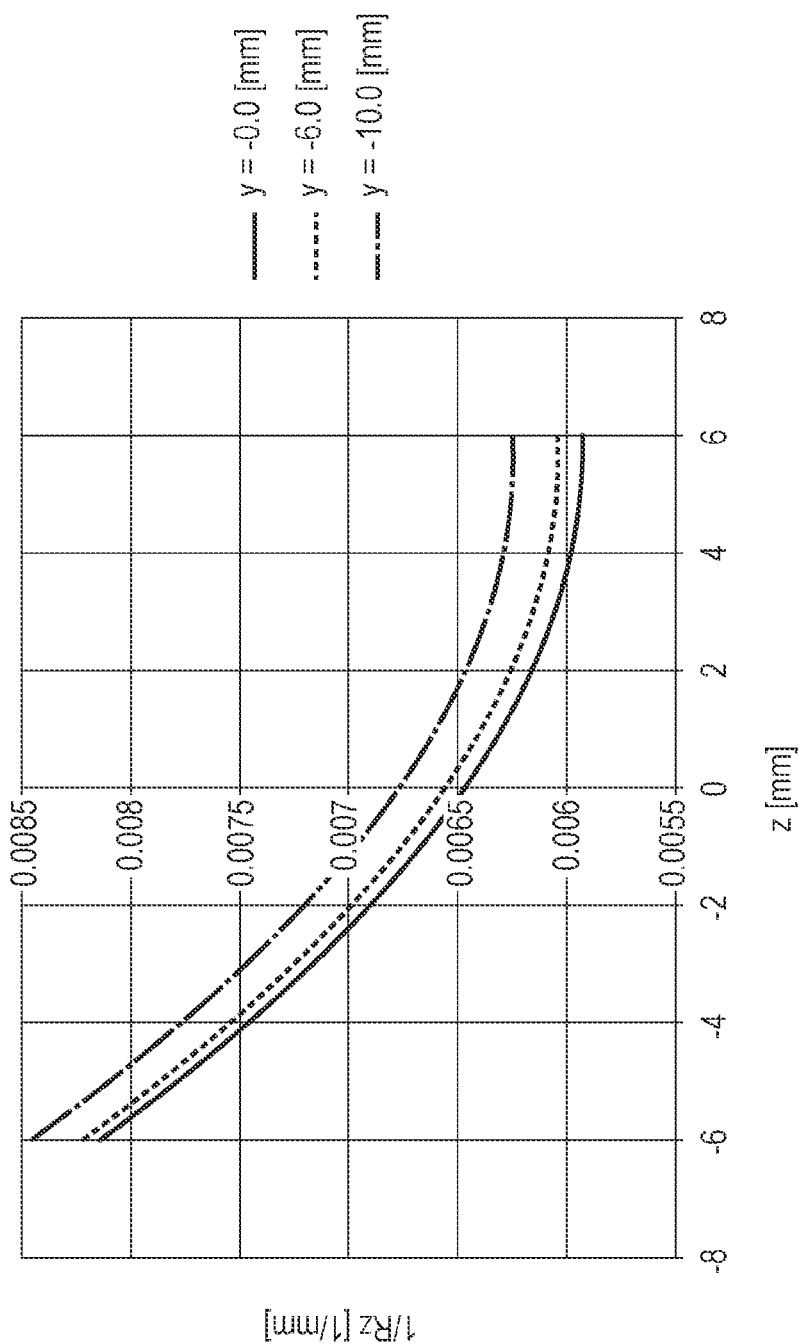
FIG. 9 illustrates the partial curvature of the fourth reflection surface in a zx section according to the embodiment.

FIG. 9 illustrates the partial curvature (the aspherical surface degree) of the fourth reflection surface 6 in the second section. In FIG. 9, the horizontal axis represents a position [mm] in the z-direction with respect to the origin of the local coordinate system of the fourth reflection surface 6, and the vertical axis represents the partial curvature $1/R_z$ [1/mm] of the fourth reflection surface 6. $R_z$ is the partial curvature radius of the fourth reflection surface 6 in the second section. In FIG. 9, a solid line, a dashed line, and a one-dot chain line represent graphs at positions of y=0.0 [mm], y=−6.0 [mm], and y=−10.0 [mm] in the local coordinate system.

As seen from FIG. 9, the partial curvature $1/R_z$ in a −z region and that in a +z region are asymmetric with respect to the optical axis (the x-axis). Specifically, the partial curvature $1/R_z$ in the −z region is larger than that in the +z region. The partial curvature $1/R_z$ changes (asymmetrically changes) in different manners between the −z region and the +z region with respect to the optical axis. According to the present embodiment, the partial curvature $1/R_z$ in the −z region increases as the position is closer to an off-axis position, and the partial curvature $1/R_z$ in the +z region decreases as the position is closer to an off-axis position. The partial curvature $1/R_z$ increases as the position is away from a position of y=0 [mm].

FIG. 10 illustrates states of focus of light beams at different wavelengths on the light-receiving surface 7 in the second section (y=0 [mm]) along the optical axis according to the present embodiment. Specifically, FIG. 10 illustrates optical paths on which the principal rays and the marginal rays of light beams at wavelengths of λ1=700 nm, λ2=400 nm, and λ3=1000 nm reach the light-receiving surface 7. The present embodiment is designed such that the principal ray at a wavelength of λ1=700 nm enters on the optical axis (the x-axis) of the fourth reflection surface 6. In FIG. 10, signs for the rays at the wavelengths are the same as those in FIG. 2, and an illustration of the diffraction gratings on the diffractive surface 5 is omitted as in FIG. 2.

As illustrated in FIG. 10, the curvature of the +z region of the fourth reflection surface 6 with respect to the optical axis, that is, the same (near) region as that of a vertex 54 of the base surface of the diffractive surface 5 decreases as the position is closer to an off-axis position. The curvature of the −z region of the fourth reflection surface 6 with respect to the optical axis, that is, the region opposite (far) the vertex 54 of the base surface of the diffractive surface 5 increases as the position is closer to an off-axis position. Consequently, the marginal ray L3L that enters the +z region of the fourth reflection surface 6 and the marginal ray L3U that enters the −z region of the fourth reflection surface 6 are reflected so to as approach the principal ray L3P. As seen from FIG. 10, the comatic aberration of the light-receiving surface 7 is successfully corrected for the light beams at all of the wavelengths.

A comparative example in which only the fourth reflection surface 6 of the optical system 10 is changed will be examined to describe the effects of the fourth reflection surface 6 according to the present embodiment.

The fourth reflection surface 6 in the comparative example is obtained by changing some of aspherical surface coefficients in an expression that represents the shape of the fourth reflection surface 6 according to the present embodiment in the second section into zero. Specifically, the values of aspherical surface coefficients $M_{01}$, $M_{21}$, $M_{41}$, $M_{03}$, $M_{23}$, $M_{43}$, $M_{05}$, $M_{25}$, and $M_{45}$ in an expression (Math. 2) described later are zero. The values of $M_{01}$, $M_{05}$, $M_{25}$, and $M_{45}$ are zero also according to the present embodiment. These aspherical surface coefficients are related to the symmetry of the fourth reflection surface 6 with respect to the optical axis. That is, the partial curvature $1/R_z$ of the fourth reflection surface 6 in the comparative example is symmetric with respect to the optical axis unlike the present embodiment.

FIG. 11 illustrates states of focus of light beams at different wavelengths on the light-receiving surface 7 in the second section along the optical axis in the comparative example as in FIG. 10. Specifically, FIG. 11 illustrates optical paths on which the principal rays and the marginal rays of light beams at wavelengths of $\lambda 1=700$ nm, $\lambda 2=400$ nm, and $\lambda 3=1000$ nm reach the light-receiving surface 7. In the comparative example, as illustrated in FIG. 11, the positions of focus of the principal rays and the marginal rays at the wavelengths on the light-receiving surface 7 do not coincide, and the comatic aberration is not successfully corrected.

According to the present embodiment, in the second section, the anamorphic optical surface that is located at the position nearer than the diffractive surface 5 to the image thus has a shape in which the curvature in a region with respect to the optical axis decreases as the position is closer to an off-axis position, and the curvature in the other region with respect to the optical axis increases as the position is closer to an off-axis position. This enables the marginal rays of the light beams at the wavelengths to be focused such that the marginal rays approach the principal rays, and the different degrees of comatic aberration at the respective wavelengths can be successfully corrected.

Specifically, according to the present embodiment, the fourth reflection surface 6 is formed such that the curvature in the same region as the vertex of the base surface of the diffractive surface 5 with respect to the optical axis decreases as the position is closer to an off-axis position, and the curvature in the region opposite the vertex of the base surface of the diffractive surface 5 with respect to the optical axis increases as the position is closer to an off-axis position. The method of changing the curvature in both of the regions of the fourth reflection surface 6 with respect to the optical axis may be changed depending on directions (the directions of the optical surfaces) in which the diffractive surface 5 and the fourth reflection surface 6 deflect the light beams such that a relationship opposite that according to the present embodiment is obtained. However, an advantageous structure to decrease the size of the entire system is that an optical path extending from the light-shielding member 4 to the diffractive surface 5 intersects an optical path extending from the fourth reflection surface 6 to the light-receiving surface 7 in the second section, and the structure according to the present embodiment is preferable.

An F value of the optical system 10 according to the present embodiment will now be described. As for an optical system the optical performance of which differs between the first section and the second section as in the optical system 10 according to the present embodiment, it is preferable that the F value in each section be appropriately set. Specifically, the F value of the optical system 10 for the image in the first section preferably differs from that in the second section.

Typically, imaging performance at the opening of the light-shielding member 4 can be improved, the size of the entire system can be decreased, and the depth of field can be increased by increasing the F value of the optical system for the image. However, the amount of light at the light-receiving surface 7 decreases, and the SN ratio of a signal that is outputted from the imaging element decreases. To decrease the size of the entire optical system 10, to increase the angle of view, and to ensure the sufficient amount of light at the light-receiving surface 7, a conditional expression (2) described below is preferably satisfied where F1 is the F value for the image in the first section and F2 is the F value for the image in the second section.

$$1.00 < F1/F2 \quad (2)$$

The conditional expression (2) represents that the F value for the image in the first section is larger than the F value for the image in the second section. When the conditional expression (2) is satisfied, the F value in the first section is sufficiently large (dark), the angle of view can be increased, and various kinds of aberration can be successfully corrected. The F value in the second section is sufficiently small (bright), the sufficient amount of light at the light-receiving surface 7 can be ensured, and the resolution can be improved. When the conditional expression (2) is less than the lower limit, it is difficult to increase the angle of view in the first section and to ensure the sufficient amount of light at the light-receiving surface 7 with the entire system having a decreased size, which is not preferable.

A conditional expression (2a) described below is more preferably satisfied. When the conditional expression (2a) exceeds the upper limit, the F value for the image in the first section is too large, and it is difficult for pixels on the light-receiving surface 7 to ensure the sufficient amount of light, which is not preferable.

$$1.00 < F1/F2 < 4.50 \quad (2a)$$

Conditional expressions (2b) and (2c) described below are more preferably satisfied in order.

$$1.00 < F1/F2 < 2.00 \quad (2b)$$

$$1.03 < F1/F2 < 1.50 \quad (2c)$$

The amount of light at the light-receiving surface 7 can be increased by decreasing the F value of the optical system for the image, but this makes it difficult to correct the aberration. For this reason, to improve the ability (wavelength resolution) to recognize light beams at different wavelengths and to increase the angle of view, it is necessary to increase the number of optical elements, and the size of the entire system increases. To ensure high wavelength resolution and the sufficient amount of light at the light-receiving surface 7 with the entire system having a decreased size, a conditional expression (3) described below is preferably satisfied.

$$1.00 < F2/F1 \quad (3)$$

The conditional expression (3) represents that the F value for the image in the second section is larger than the F value for the image in the first section. When the conditional expression (3) is satisfied, the F value in the second section is sufficiently large (dark), and high wavelength resolution can be achieved. The F value in the first section is sufficiently small (bright), and the sufficient amount of light at the light-receiving surface 7 can be ensured. When the conditional expression (3) is less than the lower limit, it is difficult to ensure high wavelength resolution in the second section and the sufficient amount of light at the light-receiving surface 7 with the entire system having a decreased size, which is not preferable.

A conditional expression (3a) described below is more preferably satisfied. When the conditional expression (3a) exceeds the upper limit, the F value for the image in the second section is too large, and there is a possibility that the light beams at the opening of the light-shielding member 4 exceed the diffraction limit. In this case, the widths of the light beams in the second direction that pass through the opening of the light-shielding member 4 increase, and it is difficult to achieve good imaging performance at the light-receiving surface 7, which is not preferable.

$$1.00 < F2/F1 < 5.50 \tag{3a}$$

A conditional expression (3b) described below is preferably satisfied.

$$1.00 < F2/F1 < 2.00 \tag{3b}$$

Whether the optical system 10 satisfies the conditional expression (2) or (3) described above may be decided depending on the required performance The power of each optical surface will now be described in detail.

The optical system 10 according to the present embodiment has four reflection surfaces having the power in the first section to increase the angle of view in the first section and to achieve good optical performance. In this case, in the front group 11, the sign of the power of the first reflection surface 2 in the first section is preferably the same as that of the second reflection surface 3. This inhibits a part of the light beam from each object height from being shielded by the light-shielding surface of the light-shielding member 4. In this example, the first reflection surface 2 and the second reflection surface 3 are convex surfaces in the first section and have negative power.

Specifically, in the case where the first reflection surface 2 is a convex surface, a ray (an off-axis ray) from an off-axis object height is reflected at a position nearer to the image than a position at which a ray (an on-axis ray) from an on-axis object height is reflected. Accordingly, the reflection point of the off-axis ray on the first reflection surface 2 is located nearer than the reflection point of the on-axis ray illustrated in FIG. 2 to the −Z region. In this case, if the second reflection surface 3 is a flat surface or a concave surface, then the off-axis ray is reflected at a position nearer than the on-axis ray to the +X region. In this case, a position at which the on-axis ray enters the light-shielding member 4 shifts in the second direction relative to the position at which the on-axis ray enters the light-shielding member 4, and there is a possibility that a part of the off-axis ray does not pass through the opening.

According to the present embodiment, however, the second reflection surface 3 is a convex surface as in the first reflection surface 2, and the reflection point of the off-axis ray on the second reflection surface 3 is located nearer than the reflection point of the on-axis ray to the image (the −X region). That is, a positional shift between the reflection points of the on-axis ray and the off-axis ray due to the first reflection surface 2 can be canceled out by the second reflection surface 3. This enables the positions of focus of the on-axis ray and the off-axis ray in the second direction to get closer to each other and enables all of the rays from the object heights to pass through the opening of the light-shielding member 4. The same is true for the case where the first reflection surface 2 and the second reflection surface 3 are concave surfaces.

The second reflection surface 3 is nearer than the first reflection surface 2 to the light-shielding member 4, and the distance between the reflection points of the on-axis ray and the off-axis ray on the second reflection surface 3 is shorter than the distance between the reflection points of the on-axis ray and the off-axis ray on the first reflection surface 2.

Accordingly, it is not preferable that the power of the second reflection surface 3 is extremely smaller than the power of the first reflection surface 2 in the first section. In view of this, a conditional expression (4) described below is preferably satisfied where the power of the first reflection surface 2 and the power of the second reflection surface 3 in the first section are $\phi 1$ m and $\phi 2$ m.

$$0.90 < \phi 2\ m/\phi 1\ m \tag{4}$$

The conditional expression (4) represents that the power of the second reflection surface 3 in the first section is equal to or more than the power of the first reflection surface 2. When the conditional expression (4) is satisfied, a positional shift between the on-axis ray and the off-axis ray can be successfully corrected as described above.

Conditional expressions (4a) and (4b) described below are preferably satisfied in order. When the conditional expressions (4a) and (4b) exceed the upper limit, the power of the second reflection surface 3 in the first section is too large, and there is a possibility that the aberration is difficult to correct successfully. In addition, there is a possibility that the angle of view is difficult to increase by locating the main flat surfaces in the front group 11 in the first section such that the main flat surfaces face the object.

$$0.90 < \phi 2\ m/\phi 1\ m < 15 \tag{4a}$$

$$0.92 < \phi 2\ m/\phi 1\ m < 10 \tag{4b}$$

For the same reason, in the rear group 12, the sign of the power of the third reflection surface 5 in the first section is preferably the same as that of the fourth reflection surface 6. This inhibits the positions of focus of the light beams that pass through the opening of the light-shielding member 4 on the light-receiving surface 7 from shifting in the second direction. In this example, the third reflection surface 5 and the fourth reflection surface 6 are convex surfaces in the first section and have positive power. In this case, a conditional expression (5) described below is preferably satisfied, and conditional expressions (5a) and (5b) are preferably satisfied in order, where the power of the third reflection surface 5 and the power of the fourth reflection surface 6 in the first section are $\phi 3$ m and $\phi 4$ m.

$$1.0 < \phi 3\ m/\phi 4\ m \tag{5}$$

$$1.0 < \phi 3\ m/\phi 4\ m \tag{5a}$$

$$1.5 < \phi 3\ m/\phi 4\ m \tag{5b}$$

The effect with the result that the signs of the power of each reflection surface of the front group 11 and the rear group 12 are the same is achieved particularly in the case where the reflection surface is located such that the optical paths intersect each other in the front group 11 and the rear group 12 as described above. In the case where the optical paths do not intersect each other in the front group 11 and the rear group 12, for example, in the case where each of the optical paths has a Z-shape, the signs of the power of each reflection surface of the front group 11 and the rear group 12 may be configured to differ from each other as needed.

To decrease the size and costs of the optical system 10, the number of optical elements that are included in the optical system 10 is preferably decreased as much as possible. According to the present embodiment, reflection surfaces that have the power in the first section correspond to only the first reflection surface 2, the second reflection surface 3, the third reflection surface 5, and the fourth reflection surface 6. That is, in the first section, only the first reflection surface 2 and the second reflection surface 3 among the reflection surfaces in the front group 11 have the power and only the third reflection surface 5 and the fourth reflection surface 6 among the reflection surfaces in the rear group 12 have the power. The optical system 10 has the minimum number of the reflection surfaces to achieve good optical performance, and the size of the entire system can be consequently decreased.

According to the present embodiment, in the first section, the front group 11 has negative power with the result that the first reflection surface 2 and the second reflection surface 3 have negative power, and the rear group 12 has positive power with the result that the third reflection surface 5 and the fourth reflection surface 6 have positive power. Consequently, the optical system 10 is of a retrofocus type in the first section as described above, and the angle of view can be increased.

A conditional expression (6) described below is preferably satisfied where the power of the first reflection surface 2 and the power of the second reflection surface 3 in the second section are $\phi 1$ s and $\phi 2$ s.

$$\phi 1 \ s/\phi 2 \ s < 1.0 \quad (6)$$

The conditional expression (6) represents that the power of the second reflection surface 3 in the second section is larger than the power of the first reflection surface 2. When the conditional expression (6) is satisfied, the second reflection surface 3 that has increased power in the second section can be near the light-shielding member 4 that is located at an intermediate imaging position. This makes it easy to decrease the magnification of the front group 11 to obtain a reduction system and enables the depth of field to be increased. When the conditional expression (6) exceeds the upper limit, the first reflection surface 2 that is disposed near the object has increased power, and the front group 11 is difficult to be the reduction system.

A conditional expression (6a) described below is more preferably satisfied. When the conditional expression (6a) is less than the lower limit, the power of the second reflection surface 3 in the second section is too large, it is difficult to correct the aberration successfully, and there is a possibility that a part of each light beam cannot pass through the opening of the light-shielding member 4.

$$0.0 < \phi 1 \ s/\phi 2 \ s < 1.0 \quad (6a)$$

A conditional expression (7) described below is preferably satisfied where the power of the third reflection surface 5 and the power of the fourth reflection surface 6 in the second section are $\phi 3$ s and $\phi 4$ s.

$$1.0 < \phi 3 \ s/\phi 4 \ s \quad (7)$$

The width of the image that is formed on the light-receiving surface 7 in the second direction is determined depending on the width of the opening of the light-shielding member 4 in the second direction. In this case, the wavelength resolution (the spectral performance) decreases as the width of the image that is formed on the light-receiving surface 7 increases, which is not preferable. Accordingly, the rear group 12 is preferably the reduction system, and the magnification thereof is preferably decreased. When the conditional expression (7) is satisfied, the rear group 12 is easy to be the reduction system.

Conditional expressions (7a) and (7b) described below are more preferably satisfied in order. When the conditional expressions (7a) and (7b) are less than the lower limit, the widths of the light beams that enter the fourth reflection surface 6 in the second section are too great, and the power of the fourth reflection surface 6 is too large, and it is difficult to appropriately control the positions of focus of the light beams at the wavelengths on the light-receiving surface 7. When the conditional expressions (7a) and (7b) exceed the upper limit, the fourth reflection surface 6 is similar to a flat surface in the second section, the power thereof is too small, and it is difficult to decrease a difference between the optical paths of the light beams at the wavelengths. In other words, it is difficult to inhibit the positions of focus of the light beams at the wavelengths from shifting in the direction of the optical axis.

$$1.5 < \phi 3 \ s/\phi 4 \ s < 8.0 \quad (7a)$$

$$2.0 < \phi 3 \ s/\phi 4 \ s < 5.0 \quad (7b)$$

According to the present embodiment, the base surface of the third reflection surface 5 that is a diffractive surface is an anamorphic surface, the occurrence of misalignment of the third reflection surface 5 such as rotation about the optical axis leads to the occurrence of astigmatism and decrease in the depth of field. When the light beams enter the third reflection surface 5, the light beams are widest in the rear group 12, and the influence of the misalignment of the third reflection surface 5 is remarkable. In view of this, a conditional expression (8) described below is preferably satisfied.

$$0.5 < \phi 3 \ s/\phi 3 \ m < 2.0 \quad (8)$$

The conditional expression (8) represents that the power of the third reflection surface 5 in the first section does not greatly differ from that in the second section. When the conditional expression (8) is satisfied, the astigmatism due to the misalignment of the third reflection surface 5 can be inhibited from occurring, and the depth of field can be inhibited from decreasing. When the conditional expression (8) is not satisfied, a difference between the power of the third reflection surface 5 in the first section and that in the second section is too large, and it is difficult to reduce the influence of the misalignment of the third reflection surface 5.

Conditional expressions (8a) and (8b) described below are more preferably satisfied in order.

$$0.6 < \phi 3 \ s/\phi 3 \ m < 1.8 \quad (8a)$$

$$0.8 < \phi 3 \ s/\phi 3 \ m < 1.3 \quad (8b)$$

The fourth reflection surface 6 preferably has positive power in the second section. As illustrated in FIG. 2, the lengths of optical paths for the rays L4P and L5P from the third reflection surface 5 to the light-receiving surface 7 are longer than the length of an optical path for the ray L3P from the third reflection surface 5 to the light-receiving surface 7. In this case, the fourth reflection surface 6 is a concave surface in the second section, and this enables the difference between the optical paths of the light beams at the wavelengths from the third reflection surface 5 to be readily decreased.

EXAMPLE 1

An optical system 10 in example 1 of the present invention will be described. The optical system 10 in the present example has the same structure as that of the optical system 10 according to the embodiment described above.

In the present example, the distance from the test object to the aperture stop 1 (an object distance) is 300 mm, the width of the readout region in the first direction is 300 mm, and the angle of view in the first section is ±24.17°. In the present example, the wavelength band that is used is 400 nm to 1000 nm, and the width of an imaging region (an incident region) for a light beam on the light-receiving surface 7 in the second direction is 2.7 mm.

In the present example, the combined focal lengths of the front group 11 and the rear group 12 in the first section are −16.27 mm and 28.30 mm, and the combined focal lengths of the front group 11 and the rear group 12 in the second section are 19.99 mm and 25.76 mm. As for the optical system 10 in the present example, intermediation in the second section enables the imaging performance to be improved, and the retrofocus type in the first section enables the angle of view to be increased (the readout region is widened).

Expressions for the shapes of the optical surfaces of the optical system 10 in the present example will now be described. The expressions for the shapes of the optical surfaces are not limited to the following description, and the optical surfaces may be designed by using other expressions as needed.

In the present example, the shapes (the primary-line shapes) of the base surfaces of the first reflection surface 2, the second reflection surface 3, the third reflection surface (the diffractive surface) 5, and the fourth reflection surface 6 in the first section are expressed as an expression described below in the local coordinate system thereof.

$$x = \frac{y^2/R_y}{1+\sqrt{1-(1+K_y)(y/R_y)^2}} + B_2 y^2 + B_4 y^4 + B_6 y^6 \quad \text{[Math. 1]}$$

$R_y$ is the curvature radius (the radius of primary-line curvature) in the xy section, and $K_y$, $B_2$, $B_4$, and $B_6$ are aspherical surface coefficients in the xy section. The aspherical surface coefficients $B_2$, $B_4$, and $B_6$ may be configured to have different values between both regions (a −y region and a +y region) in the x-axis as needed. This enables the primary-line shapes to be asymmetric in the y-direction with respect to the x-axis. In the present example, secondary to senary aspherical surface coefficients are used, but a higher degree of aspherical surface coefficient may be used as needed.

In the present example, the shape (the secondary-line shape) of the base surface of each optical surface in the second section at a position in the y-direction is expressed as an expression described below.

$$s = \frac{z^2/r'}{1+\sqrt{1-(1+K_z)(z/r')^2}} + \sum\sum M_{jk} y^j z^k \quad \text{[Math. 2]}$$

$K_z$ and $M_{jk}$ are aspherical surface coefficients in the zx section. r' is the curvature radius (the radius of secondary-line curvature) in the zx section at a position y away from the optical axis in the y-direction and is expressed as an expression described below.

$$\frac{1}{r'} = \frac{1}{r} + E_2 y^2 + E_4 y^4 \quad \text{[Math. 3]}$$

r is the radius of secondary-line curvature on the optical axis, and $E_2$ and $E_4$ are secondary-line change coefficients. In the expression (Math. 3), the first term of the right-hand side of the expression (Math. 2) is zero when r=0 is satisfied. The secondary-line change coefficients $E_2$ and $E_4$ may be configured to have different values between the −y region and the +y region as needed. This enables the aspherical surface degree of the secondary-line shape to be asymmetric in the y-direction. The expression (Math. 3) includes only even terms but may be made to include an odd term as needed. A high degree of secondary-line change coefficient may be used as needed.

The primary term of z in the expression (Math. 2) contributes to the tilt amount (the secondary-line tilt amount) of each optical surface in the zx section. Accordingly, $M_{jk}$ has different numerical values between the −y region and the +y region, and the secondary-line tilt amount can be consequently changed asymmetrically in the y-direction. The secondary-line tilt amount may be changed asymmetrically by using an odd term. The quadratic term of z in the expression (Math. 2) contributes to the radius of secondary-line curvature of each optical surface. Accordingly, the radius of secondary-line curvature is provided to the optical surface by using only the quadratic term of z in the expression (Math. 2) instead of the expression (Math. 3) to simplify the design of the optical surface.

The shapes of the diffraction gratings on the diffractive surface 5 are not particularly limited provided that the shapes are expressed by a phase function based on known diffractive optical theory. In the present example, the shapes of the diffraction gratings on the diffractive surface 5 are defined as a phase function φ described below, where λ[mm] is a fundamental wavelength (a designed wavelength), and C1 is a phase coefficient in the zx section. According to the present embodiment, however, the diffraction order of the diffraction gratings is 1.

$$\phi = (2\pi/\lambda) \times (C1 \times z)$$

The fundamental wavelength described herein means a wavelength for determining the height of each diffraction grating and is determined based on, for example, spectral properties of illumination light to the test object, the spectral reflectance of each reflection surface other than the diffractive surface 5, the spectral light-receiving sensitivity of each imaging element including the light-receiving surface 7, and the required diffraction efficiency. That is, the fundamental wavelength corresponds to a wavelength that is regarded as important during detection with the light-receiving surface 7. In the present example, the fundamental wavelength λ is 542 nm, and a visible region in the wavelength band that is used can be predominantly observed. However, the fundamental wavelength may be, for example, about 850 nm so that a near infrared region is predominantly observed, or the fundamental wavelength may be about 700 nm so that a region from the visible region to the near infrared region can be observed in a well-balanced manner Table 1 illustrates the position of the vertex of each optical surface of the optical system 10 in the present example, the direction of a normal at the vertex, and the curvature radius in each section. In Table 1, the position of the vertex of each optical surface is represented by distances X, Y, and Z [mm] from the origin in an absolute coordinate system, and the direction of the normal (x-axis) is represented by an angle θ [deg] with respect to the X-axis in the ZX section along the optical axis. d [mm] represents the distance (the surface distance) between the optical surfaces, and d' [mm] represents the distance between the reflection points of the principal rays on the optical surfaces. $R_y$ and $R_z$ represent the radii of curvature in the XY section and in the ZX section at the reflection points of the principal rays. When the value of the curvature radius of each reflection surface is positive, a concave surface is represented, and when the value is negative, a convex surface is represented.

TABLE 1

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.458 | 15.473 |  |  |
| FIRST REFLECTION SURFACE | 2 | 15.458 | 0.000 | −1.751 | −157.83 | 9.802 | 9.797 | −309.32 | 287.2587 |
| SECOND REFLECTION SURFACE | 3 | 8.530 | 0.000 | −8.684 | 66.71 | 18.589 | 18.578 | −38.6807 | 43.27758 |
| LIGHT-SHIELDING MEMBER | 4 | 8.924 | 0.000 | 9.900 | 90.00 | 49.797 | 49.794 |  |  |
| THIRD REFLECTION SURFACE | 5 | 10.058 | 0.000 | 59.684 | −107.49 | 20.134 | 20.144 | 65.54156 | 57.12943 |
| FOURTH REFLECTION SURFACE | 6 | 0.335 | 0.000 | 42.054 | 30.40 | 25.247 | 25.239 | 159.9746 | 154.6239 |
| COVER GLASS | G | 25.582 | 0.000 | 41.900 | 0.00 | 0.600 | 0.600 |  |  |
| LIGHT-RECEIVING SURFACE | 7 | 26.182 | 0.000 | 41.900 | 0.00 |  |  |  |  |

Table 2 represents the shape of each optical surface of the optical system 10 in the present example.

TABLE 2

|  | FIRST REFLECTION SURFACE | SECOND REFLECTION SURFACE | THIRD REFLECTION SURFACE | FOURTH REFLECTION SURFACE |
|---|---|---|---|---|
| $R_y$ | −3.093E+02 | −3.868E+01 | 6.554E+01 | 1.600E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 8.067E−06 | −1.590E−05 | 5.840E−07 | −8.601E−07 |
| $B_6$ | −5.811E−11 | −3.260E−07 | −1.134E−11 | 4.309E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 1.398E−04 | 2.471E−04 | −1.632E−05 | −7.584E−05 |
| $M_{41}$ | 6.002E−07 | 2.947E−06 | −1.121E−08 | 7.866E−09 |
| $M_{02}$ | 1.741E−03 | 1.155E−02 | 8.752E−03 | 3.234E−03 |
| $M_{22}$ | 2.824E−05 | −5.717E−05 | 1.120E−06 | 1.186E−06 |
| $M_{42}$ | −1.558E−08 | 3.920E−08 | −3.108E−10 | 3.801E−09 |
| $M_{03}$ | −1.283E−05 | 1.259E−04 | 1.370E−05 | −3.088E−05 |
| $M_{23}$ | 1.542E−06 | 1.055E−05 | 0.000E+00 | 1.564E−08 |
| $M_{43}$ | −1.167E−08 | 1.254E−07 | 0.000E+00 | −1.896E−10 |
| $M_{04}$ | 1.214E−04 | −1.906E−04 | 6.180E−07 | 1.353E−06 |
| $M_{24}$ | 1.459E−07 | −2.301E−06 | 0.000E+00 | 5.803E−10 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 |  |  | 6.331E−02 |  |
| λ |  |  | 5.420E−04 |  |

Table 3 illustrates the diameters [mm] of the opening of the aperture stop 1, the opening of the light-shielding member 4, and the light-receiving surface 7 in the y-direction and in the z-direction when the conditional expression (2) is satisfied (example 1a). Table 4 illustrates the diameters [mm] of the opening of the aperture stop 1, the opening of the light-shielding member 4, and the light-receiving surface 7 in the y-direction and in the z-direction when the conditional expression (3) is satisfied (example 1b). In the present example, the opening of the aperture stop 1, the opening of the light-shielding member 4, and the light-receiving surface 7 are rectangular.

TABLE 3

|  | APERTURE STOP | LIGHT-SHIELDING MEMBER | LIGHT-RECEIVING SURFACE |
|---|---|---|---|
| DIAMETER (y) | 35.2 | 3.6 | 7.2 |
| DIAMETER (z) | 3.6 | 0.05 | 5.4 |

TABLE 4

|  | APERTURE STOP | LIGHT-SHIELDING MEMBER | LIGHT-RECEIVING SURFACE |
|---|---|---|---|
| DIAMETER (y) | 35.2 | 3.6 | 7.2 |
| DIAMETER (z) | 3.0 | 0.05 | 5.4 |

Figure 12:
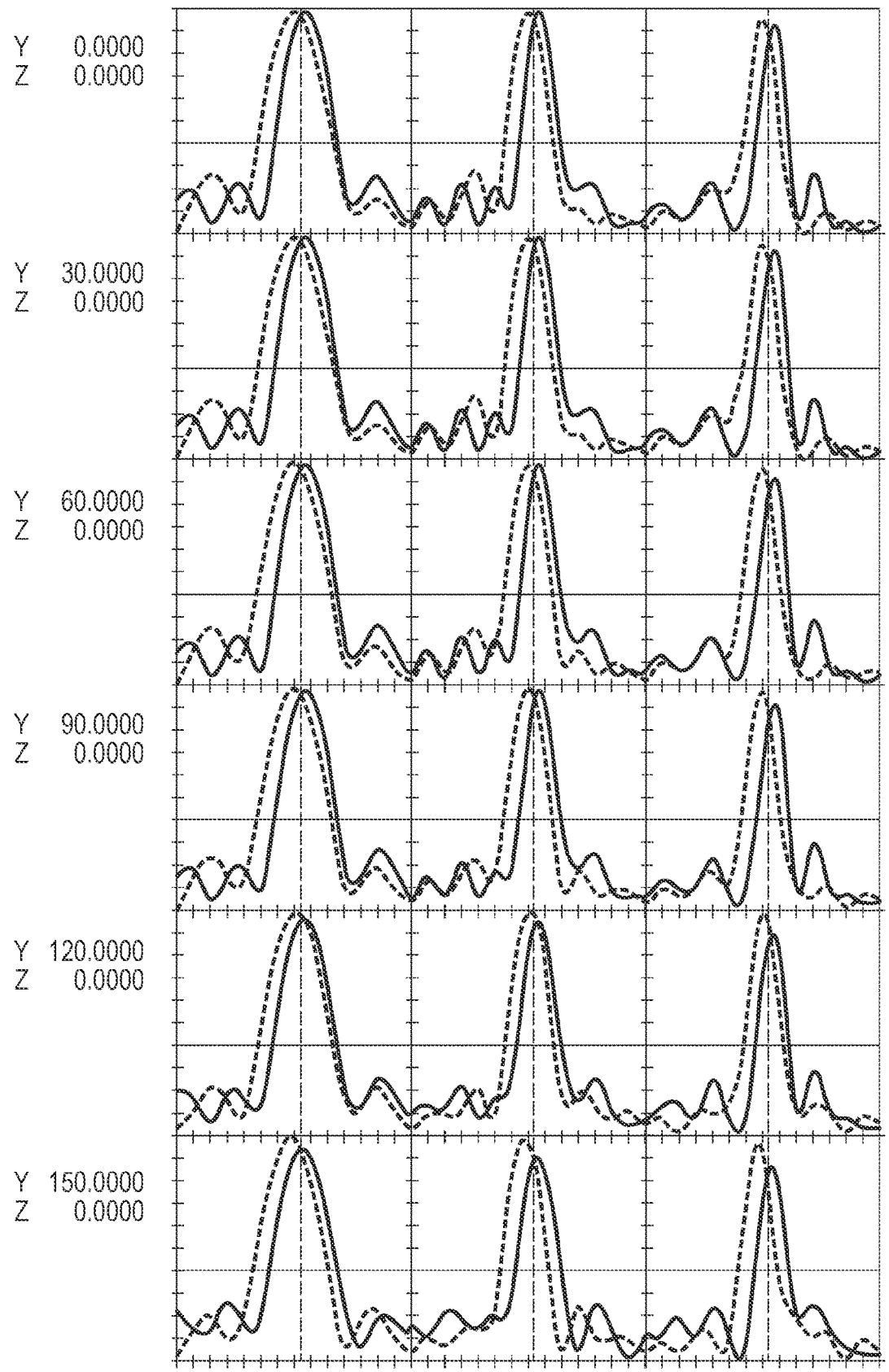
FIG. 12 illustrates the MTF of an optical system in example 1.

FIG. 12 illustrates the MTF (Modulated Transfer Function) of the optical system 10 in the present example. FIG. 12 illustrates the MTF at wavelengths of 700 nm (frq1), 400 nm (frq2), and 1000 nm (frq3) when the object height [mm] in the readout region satisfies Y=0, 30, 60, 90, 120, or 150. As illustrated in FIG. 12, spatial frequencies [number/mm] of each imaging element including the light-receiving surface 7 at the wavelengths are 27.8, 41.7, and 55.6. As seen from FIG. 12, the aberration is successfully corrected over the entire readout region, and the depth of focus is sufficiently ensured.

EXAMPLE 2

An optical system 10 in example 2 of the present invention will now be described. A description of components of the optical system 10 in the present example like to those of the optical system 10 in the example 1 described above is omitted.

FIG. 13 schematically illustrates principal parts of the optical system 10 according to the embodiment of the present invention in the first and second sections. In the optical system 10 in the present example, the length of the optical path from the aperture stop 1 to the light-receiving surface 7 is shorter than that in the optical system 10 in the example 1, and the size of the entire system is further decreased.

In the present example, the distance from the test object to the aperture stop 1 is 300 mm, the width of the readout region in the first direction is 300 mm, and the angle of view in the first section is ±24.46°. In the present example, the wavelength band that is used is 400 nm to 1000 nm, and the width of the imaging region on the light-receiving surface 7 in the second direction is 2.7 mm. The combined focal lengths of the front group 11 and the rear group 12 in the present example in the first section are −14.21 mm and 16.69 mm, and the combined focal lengths of the front group 11 and the rear group 12 in the second section are 19.33 mm and 11.01 mm.

Table 5 illustrates the position of the vertex of each optical surface of the optical system 10 in the present example, the direction of a normal at the vertex, and the curvature radius in each section as in the example 1, and Table 6 illustrates the shape of each optical surface. Table 7 illustrates the diameters of the opening of the aperture stop 1, the opening of the light-shielding member 4, and the light-receiving surface 7 when the conditional expression (2) is satisfied (example 2a), and Table 4 illustrates the diameters of the opening of the aperture stop 1, the opening of the light-shielding member 4, and the light-receiving surface 7 when the conditional expression (3) is satisfied (example 2b).

Local coordinate systems that differ from each other for positions are defined such that the normal at each of the positions on a primary line expressed as the expression (Math. 1) coincides with the x-axis, and the shape of the third reflection surface 5 in the second section is expressed as the expression (Math. 2) described above. The reason why the values of the curvature radius $R_y$ in Table 5 differ from those in Table 6 is that the tilt angle in the second section is taken into account for the values of the curvature radius in Table 5.

TABLE 5

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.096 | 15.449 |  |  |
| FIRST REFLECTION SURFACE | 2 | 15.000 | 0.000 | 0.000 | −158.94 | 11.302 | 10.765 | −63.9777 | 113.3358 |
| SECOND REFLECTION SURFACE | 3 | 5.990 | 0.000 | −6.824 | 75.87 | 14.941 | 14.891 | −68.3112 | 47.53759 |
| LIGHT-SHIELDING MEMBER | 4 | 7.855 | 0.000 | 8.000 | 90.00 | 14.228 | 14.365 |  |  |
| THIRD REFLECTION SURFACE | 5 | 10.067 | 0.000 | 22.055 | −118.94 | 12.802 | 12.640 | 36.50615 | 21.0675 |
| FOURTH REFLECTION SURFACE | 6 | 1.624 | 0.000 | 12.431 | 93.72 | 14.525 | 14.603 | 120.0635 | 98.14715 |
| LIGHT-RECEIVING SURFACE | 7 | 16.148 | 0.000 | 12.269 | 0.00 |  |  |  |  |

TABLE 6

| | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.822E+01 | −6.437E+01 | 3.650E+01 | 4.231E+01 |
| $K_y$ | 1.703E+01 | 9.706E+01 | 1.762E−01 | −2.277E+00 |
| $B_2$ | 0.000E+00 | 0.000E+00 | 0.000E+00 | 0.000E+00 |
| $B_4$ | 3.284E−05 | −2.066E−05 | 0.000E+00 | −1.019E−05 |
| $B_6$ | 5.782E−09 | −1.118E−07 | 0.000E+00 | −1.827E−07 |
| r | 9.653E+01 | 3.908E+01 | 2.098E+01 | 4.242E+01 |
| $K_z$ | 0.000E+00 | 2.277E+01 | −7.623E+00 | −1.017E+00 |
| $E_2$ | −6.566E−06 | −1.550E−04 | 0.000E+00 | −7.400E−04 |
| $E_4$ | 1.898E−07 | 1.655E−06 | 0.000E+00 | 6.481E−06 |
| $M_{01}$ | 1.134E−01 | 3.783E−01 | 0.000E+00 | 2.661E+00 |
| $M_{21}$ | −3.028E−04 | −6.369E−04 | 0.000E+00 | 1.253E−03 |
| $M_{41}$ | 2.359E−06 | 1.384E−06 | 0.000E+00 | −4.432E−07 |
| $M_{02}$ | 0.000E+00 | 0.000E+00 | 0.000E+00 | 0.000E+00 |
| $M_{22}$ | 0.000E+00 | 0.000E+00 | 0.000E+00 | 0.000E+00 |
| $M_{42}$ | 0.000E+00 | 0.000E+00 | 0.000E+00 | 0.000E+00 |
| $M_{03}$ | −2.070E−04 | 3.016E−04 | 0.000E+00 | 4.822E−03 |
| $M_{23}$ | 2.280E−06 | 3.468E−06 | 0.000E+00 | −1.638E−04 |
| $M_{43}$ | 0.000E+00 | 0.000E+00 | 0.000E+00 | 6.876E−06 |
| $M_{04}$ | 2.383E−05 | 7.545E−07 | 0.000E+00 | −8.784E−05 |
| $M_{24}$ | −1.916E−07 | 3.838E−06 | 0.000E+00 | 0.000E+00 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | −7.032E−07 | 0.000E+00 | 0.000E+00 |
| $M_{46}$ | 0.000E+00 | 0.000E+00 | 0.000E+00 | 0.000E+00 |
| C1 | | | | 1.330E−01 |
| λ | | | | 7.000E−04 |

TABLE 7

| | APERTURE STOP | LIGHT-SHIELDING MEMBER | LIGHT-RECEIVING SURFACE |
|---|---|---|---|
| DIAMETER (y) | 31.6 | 2.0 | 7.2 |
| DIAMETER (z) | 3.6 | 0.08 | 5.4 |

TABLE 8

| | APERTURE STOP | LIGHT-SHIELDING MEMBER | LIGHT-RECEIVING SURFACE |
|---|---|---|---|
| DIAMETER (y) | 31.6 | 3.6 | 7.2 |
| DIAMETER (z) | 3.6 | 0.08 | 5.4 |

Figure 14:
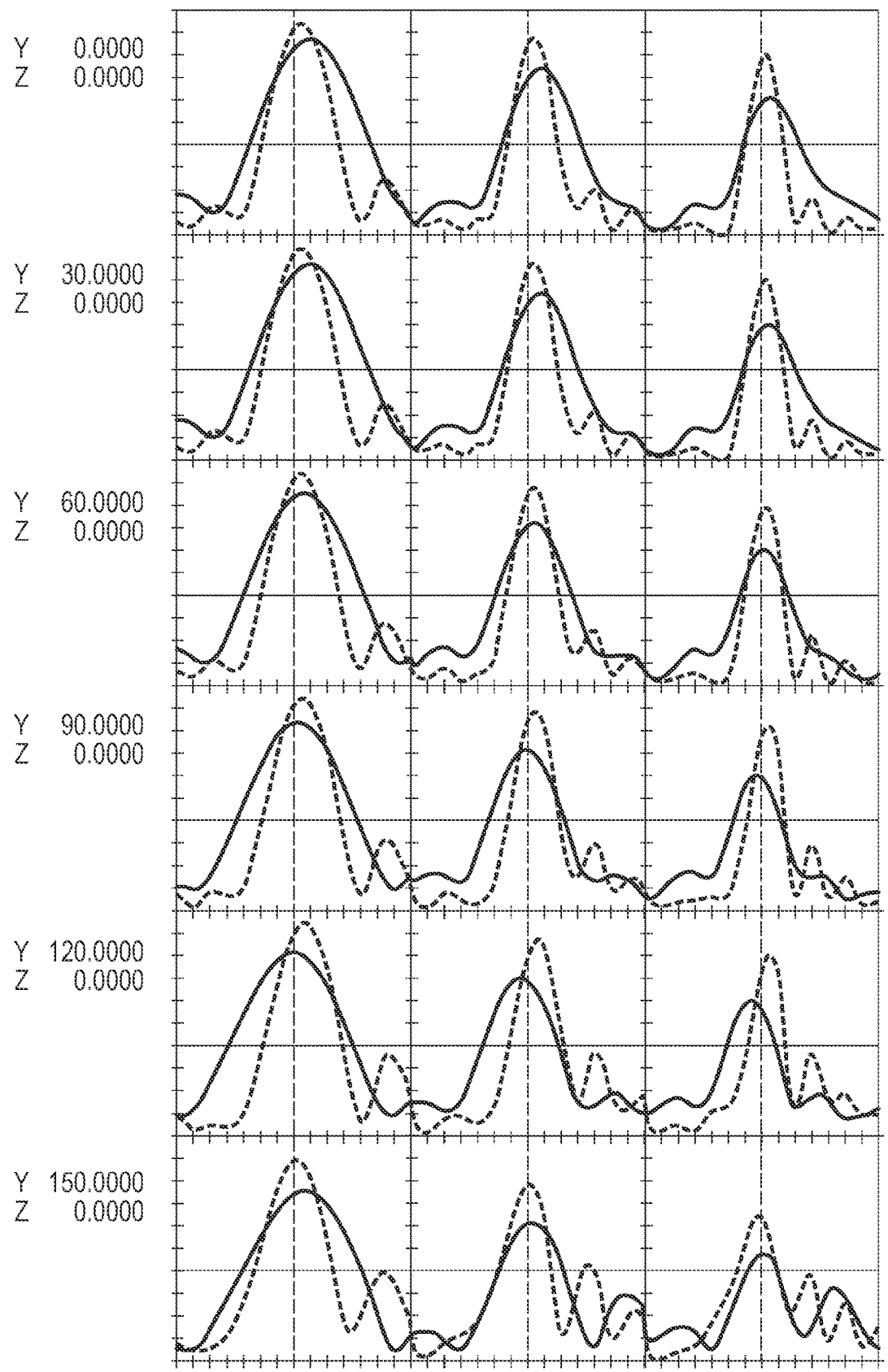
FIG. 14 illustrates the MTF of the optical system in the example 2.

FIG. 14 illustrates the MTF of the optical system 10 in the present example as in FIG. 12. As seen from FIG. 14, the aberration is successfully corrected over the entire readout region, and the depth of focus is sufficiently ensured.

EXAMPLE 3

An optical system 10 in example 3 of the present invention will now be described. A description of components of the optical system 10 in the present example like to those of the optical system 10 in the example 1 described above is omitted.

FIG. 15 schematically illustrates principal parts of the optical system 10 according to the embodiment of the present invention in the first and second sections. The values of Fno of the optical system 10 in the present example for light emission (the image) are smaller (brighter) than those of the optical system 10 in the example 1. Specifically, the values of Fno of the optical system 10 in the example 1 for light emission in the first and second sections are 4.7 and 4.0, and the values of Fno of the optical system 10 in the present example for light emission in the first and second sections are 4.1 and 3.5.

In the present example, the distance from the test object to the aperture stop 1 is 300 mm, the width of the readout region in the first direction is 300 mm, and the angle of view in the first section is ±24.44°. In the present example, the wavelength band that is used is 400 nm to 1000 nm, and the width of the imaging region on the light-receiving surface 7 in the second direction is 2.64 mm. The combined focal lengths of the front group 11 and the rear group 12 in the present example in the first section are −14.46 mm and 26.85 mm, and the combined focal lengths of the front group 11 and the rear group 12 in the second section are 19.34 mm and 24.98 mm.

Table 9 illustrates the position of the vertex of each optical surface of the optical system 10 in the present example, the direction of a normal at the vertex, and the curvature radius in each section as in the example 1, and Table 10 illustrates the shape of each optical surface. Table 11 illustrates the diameters of the opening of the aperture stop 1, the opening of the light-shielding member 4, and the light-receiving surface 7 when the conditional expression (2) is satisfied (example 3a), and Table 12 illustrates the diameters of the opening of the aperture stop 1, the opening of the light-shielding member 4, and the light-receiving surface 7 when the conditional expression (3) is satisfied (example 3b).

TABLE 9

| | | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.449 | 15.449 | | |
| FIRST REFLECTION SURFACE | 2 | 15.448 | 0.000 | −1.787 | −166.40 | 10.765 | 10.765 | −65.8139 | 113.3369 |
| SECOND REFLECTION SURFACE | 3 | 5.903 | 0.000 | −6.763 | 55.02 | 14.961 | 14.961 | −68.5038 | 47.58075 |
| LIGHT-SHIELDING MEMBER | 4 | 7.855 | 0.000 | 8.070 | 90.00 | 48.207 | 48.207 | | |
| THIRD REFLECTION SURFACE | 5 | 14.144 | 0.000 | 55.865 | −115.58 | 22.076 | 22.077 | 64.09489 | 52.67938 |

TABLE 9-continued

|  |  | X | Y | Z | θ | d | d' | $R_y$ | $R_z$ |
|---|---|---|---|---|---|---|---|---|---|
| FOURTH REFLECTION SURFACE | 6 | 0.295 | 0.000 | 38.674 | 20.44 | 21.609 | 21.609 | 103.114 | 156.1331 |
| LIGHT-RECEIVING SURFACE | 7 | 21.558 | 0.000 | 34.822 | 0.00 |  |  |  |  |

TABLE 10

|  | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.581E+01 | −6.850E+01 | 6.409E+01 | 1.031E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | 2.975E−05 | −5.799E−05 | −3.950E−07 | 3.816E−06 |
| $B_6$ | −1.050E−08 | −9.859E−07 | 3.956E−11 | −5.352E−09 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | −1.636E−04 | −1.499E−04 | 1.083E−06 | −5.606E−05 |
| $M_{41}$ | 2.424E−06 | 4.838E−06 | 1.598E−09 | −5.157E−08 |
| $M_{02}$ | 4.412E−03 | 1.051E−02 | 9.491E−03 | 3.202E−03 |
| $M_{22}$ | 5.466E−06 | −4.333E−05 | 1.169E−06 | 1.858E−06 |
| $M_{42}$ | 9.041E−08 | 6.697E−07 | −2.866E−10 | −5.249E−09 |
| $M_{03}$ | −3.609E−05 | 1.564E−04 | 1.425E−05 | −2.126E−05 |
| $M_{23}$ | 9.243E−07 | 2.513E−06 | 0.000E+00 | −1.176E−07 |
| $M_{43}$ | −1.031E−09 | −1.452E−07 | 0.000E+00 | 3.731E−11 |
| $M_{04}$ | 2.306E−05 | 3.844E−05 | −7.963E−07 | 1.295E−06 |
| $M_{24}$ | −1.858E−07 | 1.982E−05 | 0.000E+00 | 9.929E−09 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | −7.991E−07 | 0.000E+00 | 0.000E+00 |
| $M_{26}$ | 0.000E+00 | −3.458E−06 | 0.000E+00 | 0.000E+00 |
| $M_{46}$ | 0.000E+00 | 0.000E+00 | 0.000E+00 | 0.000E+00 |
| C1 |  |  |  | 8.095E−02 |
| λ |  |  |  | 7.000E−04 |

TABLE 11

|  | APERTURE STOP | LIGHT-SHIELDING MEMBER | LIGHT-RECEIVING SURFACE |
|---|---|---|---|
| DIAMETER (y) | 31.6 | 3.6 | 7.2 |
| DIAMETER (z) | 3.6 | 0.05 | 5.4 |

TABLE 12

|  | APERTURE STOP | LIGHT-SHIELDING MEMBER | LIGHT-RECEIVING SURFACE |
|---|---|---|---|
| DIAMETER (y) | 31.6 | 3.6 | 7.2 |
| DIAMETER (z) | 2.4 | 0.05 | 5.4 |

Figure 16:
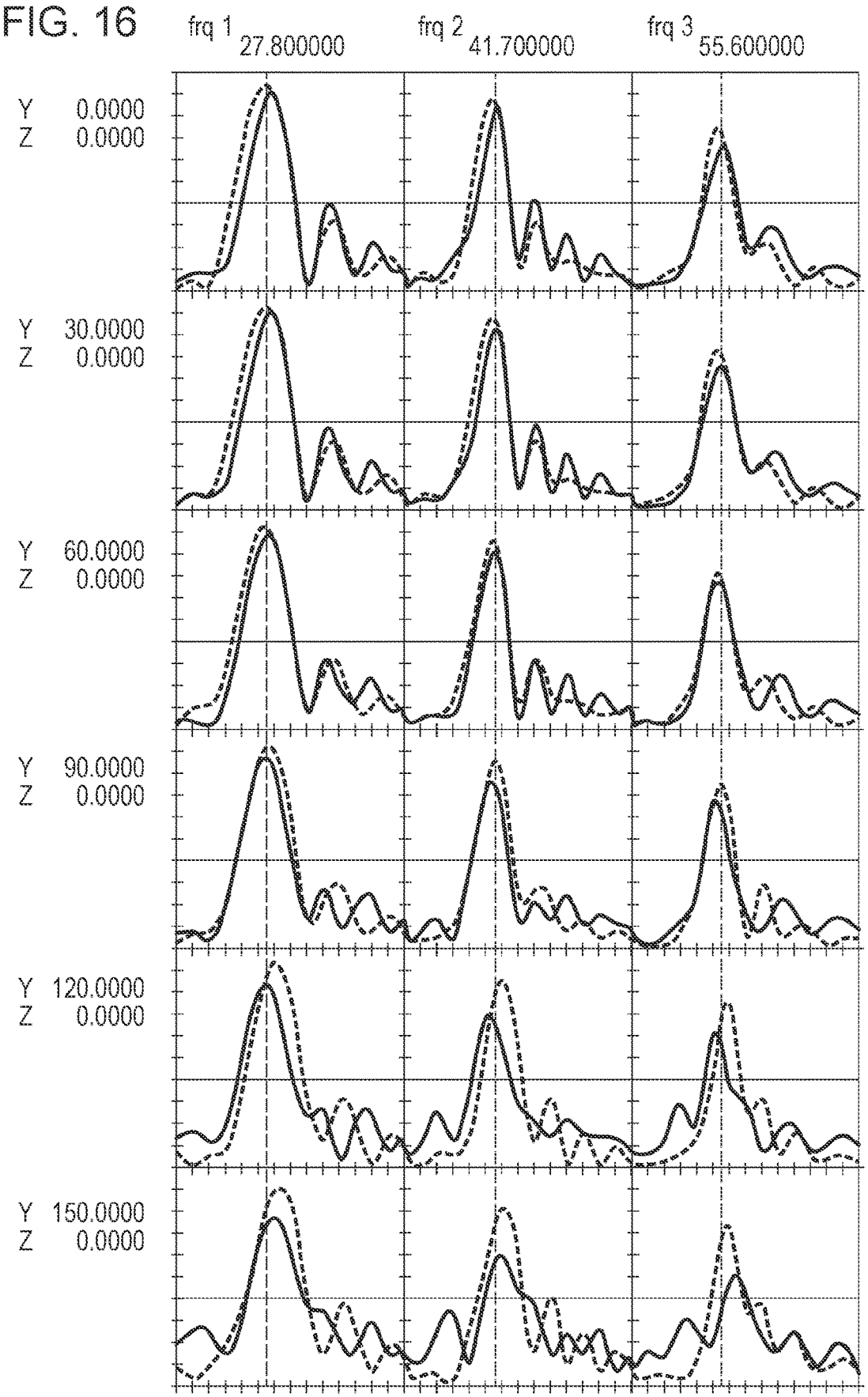
FIG. 16 illustrates the MTF of the optical system in the example 3.

FIG. 16 illustrates the MTF of the optical system 10 in the present example as in FIG. 12. As seen from FIG. 16, the aberration is successfully corrected over the entire readout region, and the depth of focus is sufficiently ensured.

EXAMPLE 4

An optical system 10 in example 4 of the present invention will now be described. A description of components of the optical system 10 in the present example like to those of the optical system 10 in the example 1 described above is omitted.

FIG. 17 schematically illustrates principal parts of the optical system 10 according to the embodiment of the present invention in the first and second sections. In the optical system 10 in the present example, the length of the optical path from the aperture stop 1 to the light-receiving surface 7 is shorter than that in the optical system 10 in the example 1, and the size of the entire system is further decreased.

In the present example, the distance from the test object to the aperture stop 1 is 300 mm, the width of the readout region in the first direction is 300 mm, and the angle of view in the first section is ±24.49°. In the present example, the wavelength band that is used is 400 nm to 1000 nm, and the width of the imaging region on the light-receiving surface 7 in the second direction is 2.37 mm. The combined focal lengths of the front group 11 and the rear group 12 in the present example in the first section are −13.23 mm and 16.78 mm, and the combined focal lengths of the front group 11 and the rear group 12 in the second section are 17.53 mm and 11.25 mm.

Table 13 illustrates the position of the vertex of each optical surface of the optical system 10 in the present example, the direction of a normal at the vertex, and the curvature radius in each section as in the example 1, and Table 14 illustrates the shape of each optical surface. Table 15 illustrates the diameters of the opening of the aperture stop 1, the opening of the light-shielding member 4, and the light-receiving surface 7 when the conditional expression (2) is satisfied (example 4a), and Table 16 illustrates the diameters of the opening of the aperture stop 1, the opening of the light-shielding member 4, and the light-receiving surface 7 when the conditional expression (3) is satisfied (example 4b). The reason why the values of the curvature radius $R_y$ in Table 13 differ from those in Table 14 is that the tilt angle in the second section is taken into account for the values of the curvature radius in Table 13.

TABLE 13

|  |  | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.096 | 15.515 |  |  |
| FIRST REFLECTION SURFACE | 2 | 15.000 | 0.000 | 0.000 | −158.94 | 11.790 | 11.068 | −63.6062 | 822.035 |

TABLE 13-continued

|  |  | X | Y | Z | θ | d | d' | $R_y$ | $R_z$ |
|---|---|---|---|---|---|---|---|---|---|
| SECOND REFLECTION SURFACE | 3 | 5.986 | 0.000 | −7.599 | 65.40 | 15.710 | 15.801 | −61.0899 | 35.63555 |
| LIGHT-SHIELDING MEMBER | 4 | 7.855 | 0.000 | 8.000 | 90.00 | 14.184 | 14.339 | | |
| THIRD REFLECTION SURFACE | 5 | 9.793 | 0.000 | 22.051 | −116.89 | 12.744 | 12.764 | 35.11489 | 21.34854 |
| FOURTH REFLECTION SURFACE | 6 | 1.384 | 0.000 | 12.474 | 95.15 | 14.679 | 14.541 | 207.4402 | 82.28998 |
| LIGHT-RECEIVING SURFACE | 7 | 16.063 | 0.000 | 12.474 | −0.01 | | | | |

TABLE 14

| | FIRST REFLECTION SURFACE | SECOND REFLECTION SURFACE | THIRD REFLECTION SURFACE | FOURTH REFLECTION SURFACE |
|---|---|---|---|---|
| $R_y$ | −6.893E+01 | −5.969E+01 | 3.511E+01 | 7.391E+01 |
| $K_y$ | 2.282E+01 | 4.694E+01 | −2.363E−01 | −7.185E+00 |
| $B_2$ | 0.000E+00 | 0.000E+00 | 0.000E+00 | 0.000E+00 |
| $B_4$ | 2.449E−05 | −2.328E−05 | 0.000E+00 | 8.733E−06 |
| $B_6$ | 4.684E−08 | −3.929E−07 | 0.000E+00 | −1.347E−07 |
| r | −7.730E+06 | 3.417E+01 | 2.122E+01 | 3.940E+00 |
| $K_z$ | 8.356E+04 | 1.676E+01 | −8.549E+00 | 6.524E−01 |
| $E_2$ | −7.041E−01 | 2.606E−03 | 0.000E+00 | 4.684E−03 |
| $E_4$ | 1.281E−01 | −6.394E−05 | 0.000E+00 | −9.506E−05 |
| $M_{01}$ | 8.736E−02 | 1.338E−01 | 0.000E+00 | 2.577E+00 |
| $M_{21}$ | −3.528E−04 | −6.227E−04 | 0.000E+00 | 1.174E−03 |
| $M_{41}$ | 1.876E−06 | −3.362E−06 | 0.000E+00 | −5.369E−06 |
| $M_{02}$ | 0.000E+00 | 0.000E+00 | 0.000E+00 | 0.000E+00 |
| $M_{22}$ | 0.000E+00 | 0.000E+00 | 0.000E+00 | 0.000E+00 |
| $M_{42}$ | 0.000E+00 | 0.000E+00 | 0.000E+00 | 0.000E+00 |
| $M_{03}$ | 4.367E−05 | 4.290E−04 | 0.000E+00 | 6.733E−03 |
| $M_{23}$ | −5.721E−07 | 5.393E−07 | 0.000E+00 | −4.559E−04 |
| $M_{43}$ | 0.000E+00 | 0.000E+00 | 0.000E+00 | 2.610E−05 |
| $M_{04}$ | 1.808E−05 | −8.959E−06 | 0.000E+00 | −3.084E−03 |
| $M_{24}$ | −4.071E−08 | −1.085E−06 | 0.000E+00 | 0.000E+00 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 1.909E−07 | 0.000E+00 | 0.000E+00 |
| $M_{46}$ | 0.000E+00 | 0.000E+00 | 0.000E+00 | 0.000E+00 |
| C1 | | | | 1.207E−01 |
| λ | | | | 7.000E−04 |

TABLE 15

| | APERTURE STOP | LIGHT-SHIELDING MEMBER | LIGHT-RECEIVING SURFACE |
|---|---|---|---|
| DIAMETER (y) | 30.8 | 2.8 | 7.2 |
| DIAMETER (z) | 3.6 | 0.1 | 5.4 |

TABLE 16

| | APERTURE STOP | LIGHT-SHIELDING MEMBER | LIGHT-RECEIVING SURFACE |
|---|---|---|---|
| DIAMETER (y) | 30.8 | 3.6 | 7.2 |
| DIAMETER (z) | 3.6 | 0.1 | 5.4 |

In the present example, the secondary-line shapes of the first reflection surface 2, the second reflection surface 3, the third reflection surface 5, and the fourth reflection surface 6 are expressed as an expression described below instead of the expression (Math. 3) described above. Local coordinate systems that differ from each other for positions on the primary line are defined as in the example 2, and the secondary-line shape of the third reflection surface 5 is expressed as the expression (Math. 2) described above.

$$r' = r(1 + E_2 y^2 + E_4 y^4)$$

Figure 18:
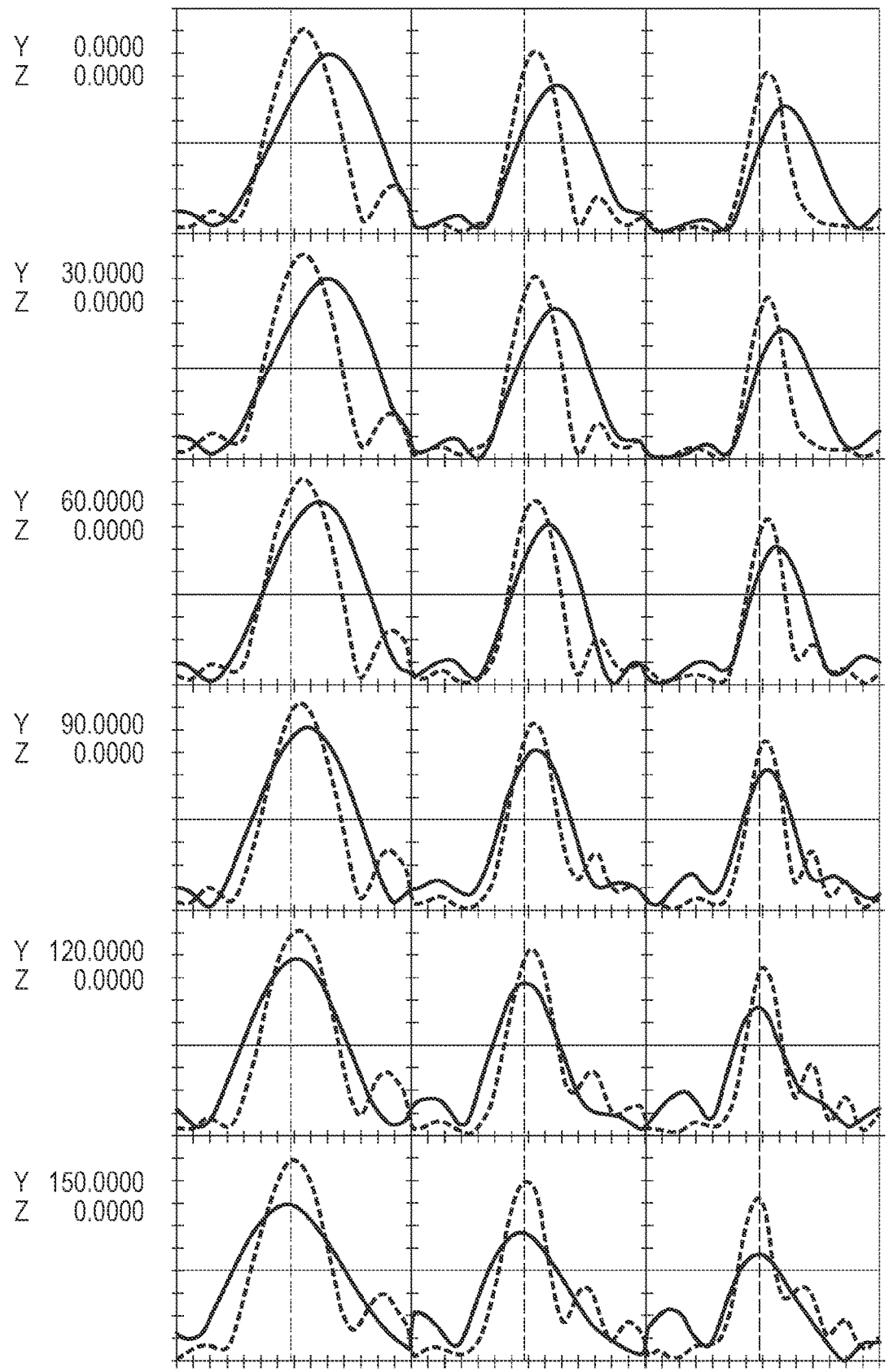
FIG. 18 illustrates the MTF of the optical system in the example 4.

FIG. 18 illustrates the MTF of the optical system 10 in the present example as in FIG. 12. As seen from FIG. 18, the aberration is successfully corrected over the entire readout region, and the depth of focus is sufficiently ensured.

EXAMPLE 5

An optical system 10 in example 5 of the present invention will now be described. The optical system 10 in the present example differs from the optical system 10 in the example 1 in that the tilt angle of the first reflection surface 2 is not changed in the first direction. A description of components of the optical system 10 in the present example like to those of the optical system 10 in the example 1 described above is omitted.

The combined focal lengths of the front group 11 and the rear group 12 in the present example in the first section are −17.01 mm and 28.56 mm, and the combined focal lengths of the front group 11 and the rear group 12 in the second section are 19.31 mm and 25.91 mm.

In the present example, as for the first reflection surface 2, the tilt angle is prevented from changing by setting the aspherical surface coefficients $M_{01}$, $M_{21}$, and $M_{41}$ of z in the expression (Math. 2) described above with respect to the primary term to zero. This enables the shape of the first reflection surface 2 to be simple and facilitates manufacturing. In particular, in the case where the first reflection surface 2 is formed by molding, the difficulty of processing of a mold decreases, and the time required for processing can greatly decrease.

Table 17 illustrates the position of the vertex of each optical surface of the optical system 10 in the present example, the direction of a normal at the vertex, and the curvature radius in each section as in the example 1, and Table 18 illustrates the shape of each optical surface.

TABLE 17

| | | X | Y | Z | θ | d | d' | $R_y$ | $R_z$ |
|---|---|---|---|---|---|---|---|---|---|
| APERTURE STOP | 1 | 0.000 | 0.000 | −1.700 | 0.00 | 15.579 | 15.473 | | |
| FIRST REFLECTION SURFACE | 2 | 15.576 | 0.000 | −1.426 | −157.68 | 10.231 | 9.797 | −199.048 | 298.6913 |
| SECOND REFLECTION SURFACE | 3 | 8.529 | 0.000 | −8.843 | 66.72 | 17.748 | 18.578 | −45.0869 | 41.44653 |
| LIGHT-SHIELDING MEMBER | 4 | 8.963 | 0.000 | 8.900 | 90.00 | 50.885 | 49.794 | | |
| THIRD REFLECTION SURFACE | 5 | 9.984 | 0.000 | 59.774 | −107.31 | 20.171 | 20.144 | 65.52191 | 57.27334 |
| FOURTH REFLECTION SURFACE | 6 | 0.264 | 0.000 | 42.100 | 30.50 | 25.337 | 25.239 | 171.3464 | 161.5763 |
| COVER GLASS | G | 25.600 | 0.000 | 41.900 | 0.00 | 0.600 | 0.600 | | |
| LIGHT-RECEIVING SURFACE | 7 | 26.200 | 0.000 | 41.900 | 0.00 | | | | |

TABLE 18

| | FIRST REFLECTION SURFACE | SECOND REFLECTION SURFACE | THIRD REFLECTION SURFACE | FOURTH REFLECTION SURFACE |
|---|---|---|---|---|
| $R_y$ | −1.987E+02 | −4.510E+01 | 6.552E+01 | 1.717E+02 |
| $K_y$ | −1.000E+00 | −1.000E+00 | −1.000E+00 | −1.000E+00 |
| $B_2$ | 0.000E+00 | 0.000E+00 | 0.000E+00 | 0.000E+00 |
| $B_4$ | −5.402E−07 | 8.306E−06 | 5.852E−07 | −7.553E−07 |
| $B_6$ | 1.030E−09 | −5.960E−08 | 1.751E−11 | 7.413E−10 |
| r | 0.000E+00 | 0.000E+00 | 0.000E+00 | 0.000E+00 |
| $K_z$ | 0.000E+00 | 0.000E+00 | 0.000E+00 | 0.000E+00 |
| $E_2$ | 0.000E+00 | 0.000E+00 | 0.000E+00 | 0.000E+00 |
| $E_4$ | 0.000E+00 | 0.000E+00 | 0.000E+00 | 0.000E+00 |
| $M_{01}$ | 0.000E+00 | 0.000E+00 | 0.000E+00 | 0.000E+00 |
| $M_{21}$ | 0.000E+00 | 2.703E−05 | −1.352E−05 | −6.440E−05 |
| $M_{41}$ | 0.000E+00 | 1.015E−06 | −9.007E−09 | 8.292E−09 |
| $M_{02}$ | 1.723E−03 | 1.210E−02 | 8.729E−03 | 3.086E−03 |
| $M_{22}$ | 2.510E−05 | −8.690E−05 | 1.012E−06 | 1.057E−06 |
| $M_{42}$ | −8.681E−08 | 1.022E−06 | −3.130E−10 | 3.696E−09 |
| $M_{03}$ | −1.507E−04 | 1.562E−04 | 1.073E−05 | −3.130E−05 |
| $M_{23}$ | 3.392E−06 | 1.263E−05 | 0.000E+00 | 1.854E−08 |
| $M_{43}$ | −1.104E−08 | −7.062E−08 | 0.000E+00 | −3.573E−10 |
| $M_{04}$ | 1.391E−04 | −2.003E−04 | 2.836E−07 | 1.304E−06 |
| $M_{24}$ | −6.650E−07 | 2.661E−06 | 0.000E+00 | 2.144E−09 |
| $M_{44}$ | 0.000E+00 | 0.000E+00 | 0.000E+00 | 0.000E+00 |
| $M_{05}$ | 0.000E+00 | 0.000E+00 | 0.000E+00 | 0.000E+00 |
| $M_{25}$ | 0.000E+00 | 0.000E+00 | 0.000E+00 | 0.000E+00 |
| $M_{45}$ | 0.000E+00 | 0.000E+00 | 0.000E+00 | 0.000E+00 |
| $M_{06}$ | 0.000E+00 | 0.000E+00 | 0.000E+00 | 0.000E+00 |
| $M_{26}$ | 0.000E+00 | 0.000E+00 | 0.000E+00 | 0.000E+00 |
| $M_{46}$ | 0.000E+00 | 0.000E+00 | 0.000E+00 | 0.000E+00 |
| C1 | | | 6.331E−02 | |
| λ | | | 5.420E−04 | |

Figure 19:
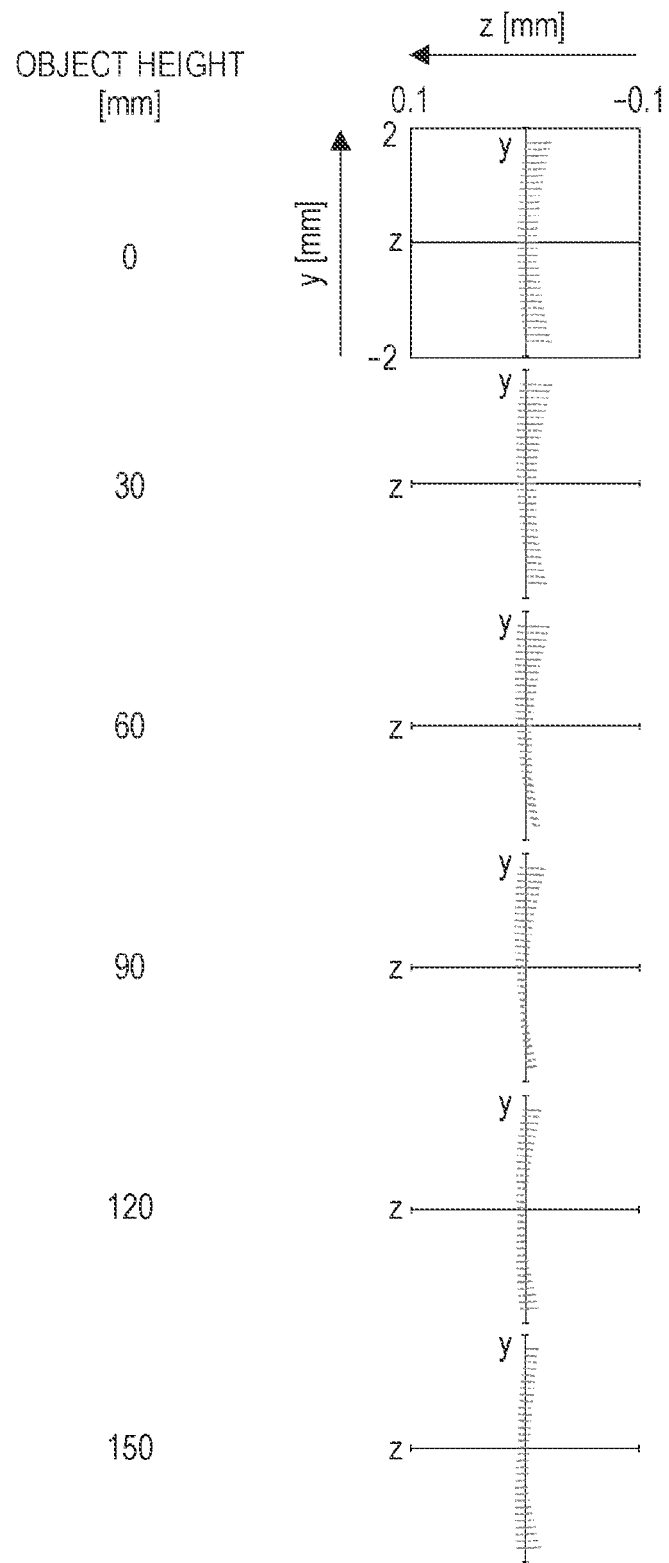
FIG. 19 illustrates a spot diagram at an opening of a light-shielding member in example 5.

FIG. 19 illustrates the distribution of the light beams from the object heights at the opening of the light-shielding member 4 in the present example as in FIG. 5. As seen from FIG. 19, the distribution of the light beams from the object heights are sufficiently inhibited from curving in the z-direction.

Table 19 illustrates the F value F1 for the image in the first section, the F value F2 for the image in the second section, and the value of the conditional expression (1) of the optical system 10 in each of the examples 1a to 4a. As illustrated in Table 19, the conditional expression (1) is satisfied in all of the examples. Table 20 illustrates the F value F1 for the image in the first section, the F value F2 for the image in the second section, and the value of the conditional expression (2) of the optical system 10 in each of the examples 1b to 4b. As illustrated in Table 20, the conditional expression (2) is satisfied in all of the examples.

TABLE 19

| | F1 | F2 | F1/F2 |
|---|---|---|---|
| EXAMPLE 1a | 4.70 | 4.00 | 1.18 |
| EXAMPLE 2a | 8.63 | 7.26 | 1.19 |
| EXAMPLE 3a | 4.06 | 3.47 | 1.17 |
| EXAMPLE 4a | 6.46 | 6.12 | 1.06 |

TABLE 20

| | F1 | F2 | F2/F1 |
|---|---|---|---|
| EXAMPLE 1b | 4.70 | 4.73 | 1.01 |
| EXAMPLE 2b | 4.79 | 7.26 | 1.52 |
| EXAMPLE 3b | 4.06 | 5.31 | 1.31 |
| EXAMPLE 4b | 5.02 | 6.12 | 1.22 |

Table 21 illustrates the values of the power of the reflection surfaces and the values of the conditional expressions described above in each of the examples.

TABLE 21

| | EXAMPLE 1 | EXAMPLE 2 | EXAMPLE 3 | EXAMPLE 4 |
|---|---|---|---|---|
| φ1m | −6.47E−03 | −3.13E−02 | −3.04E−02 | −3.14E−02 |
| φ2m | −5.17E−02 | −2.93E−02 | −2.92E−02 | −3.27E−02 |
| φ2m/φ1m | 8.00E+00 | 9.37E−01 | 9.61E−01 | 1.04E+00 |
| φ3m | 3.05E−02 | 5.48E−02 | 3.12E−02 | 5.70E−02 |
| φ4m | 1.25E−02 | 1.67E−02 | 1.94E−02 | 9.64E−03 |
| φ3m/φ4m | 2.44E+00 | 3.29E+00 | 1.61E+00 | 5.91E+00 |
| φ1s | 6.96E−03 | 1.76E−02 | 1.76E−02 | 2.43E−03 |
| φ2s | 4.62E−02 | 4.21E−02 | 4.20E−02 | 5.61E−02 |
| φ1s/φ2s | 1.51E−01 | 4.19E−01 | 4.20E−01 | 4.34E−02 |
| φ3s | 3.50E−02 | 9.49E−02 | 3.80E−02 | 9.37E−02 |
| φ4s | 1.29E−02 | 2.04E−02 | 1.28E−02 | 2.43E−02 |
| φ3s/φ4s | 2.71E+00 | 4.66E+00 | 2.96E+00 | 3.85E+00 |
| φ3s/φ3m | 1.15E+00 | 1.73E+00 | 1.22E+00 | 1.64E+00 |

Imaging Apparatus and Imaging System

An imaging apparatus (a spectrum reader) and an imaging system (a spectrum reader system) will now be described as usage examples of the optical system 10 according to the embodiment described above.

Figure 20:
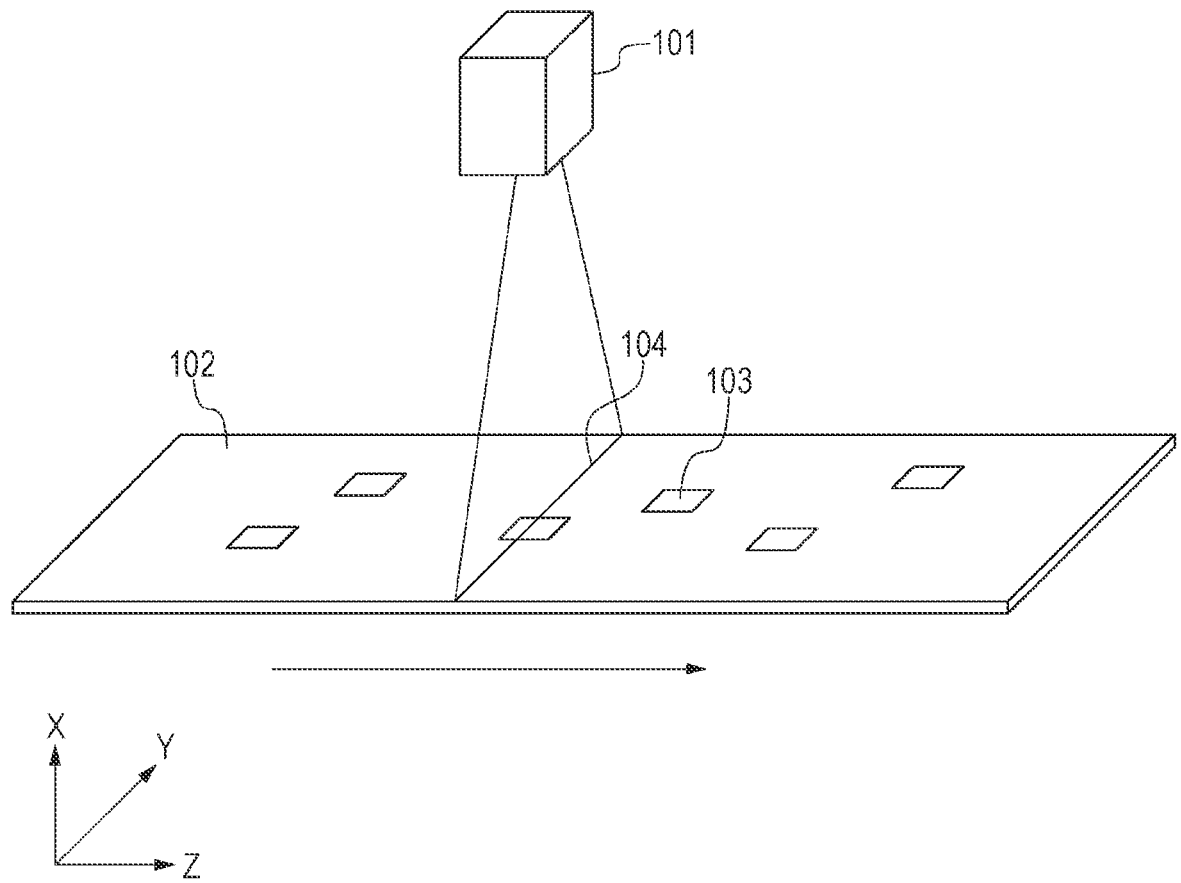
FIG. 20 schematically illustrates principal parts of an imaging system as usage example 1 of the optical system according to the embodiment.
Figure 21:
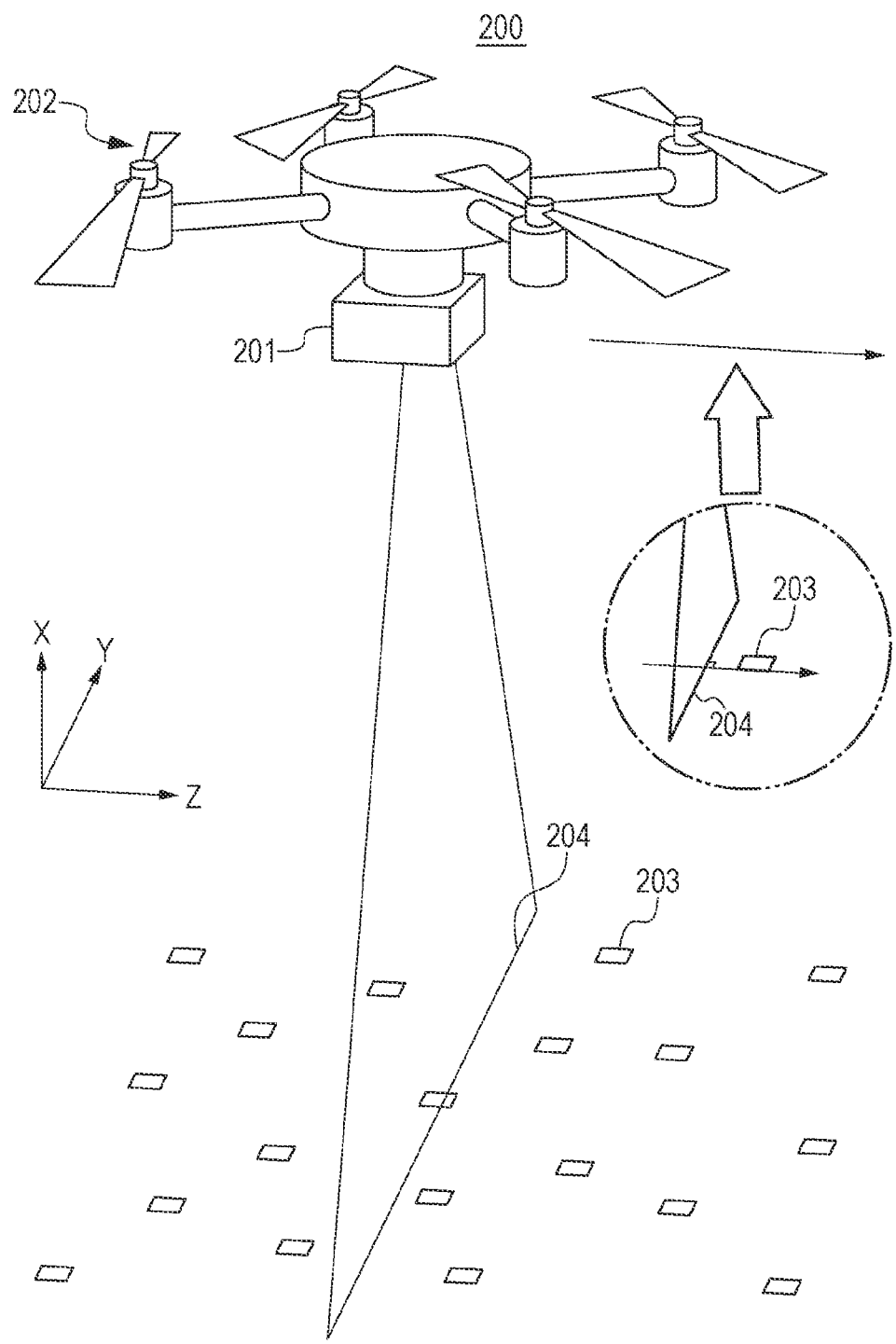
FIG. 21 schematically illustrates principal parts of an imaging system as usage example 2 of the optical system according to the embodiment.

FIG. 20 and FIG. 21 schematically illustrate principal parts of imaging systems 100 and 200 according to the embodiment of the present invention. The imaging systems 100 and 200 include imaging apparatuses 101 and 201 that include imaging elements that receive images that are formed by the optical systems 10 and conveyance units 102 and 202 that change relative positions of the imaging apparatuses and test objects 103 and 203. Each imaging system preferably includes an image-processing unit that generates an image, based on image information that is obtained from the imaging element. The image-processing unit is a processor such as a CPU and may be disposed inside or outside the imaging apparatus.

The imaging apparatuses 101 and 201 image readout regions 104 and 204 in the form of a line elongated in the first direction (the Y-direction) once and can consequently obtain pieces of image information (a one-dimensional image) related to wavelengths. Each imaging apparatus is preferably a multispectral camera that can obtain image information related to four or more kinds of wavelengths, the number of which is larger than that of a typical camera. Each imaging apparatus is more preferably a hyperspectral camera that can obtain image information related to 100 or more kinds of wavelengths.

The imaging elements of the imaging apparatuses can be CCD (Charge Coupled Device) sensors or CMOS (Complementary Metal Oxide Semiconductor) sensors. The imaging elements may be capable of performing photoelectric conversion of infrared light (near-infrared light and far-infrared light) in addition to visible light. Specifically, an imaging element composed of InGaAs or InAsSb may be used depending on the wavelength band that is used. The number of pixels of each imaging element is preferably determined based on resolution obtained in the readout direction and in the spectral direction.

As illustrated in FIG. 20, the conveyance unit 102 of the imaging system 100 moves the test object 103 in the second direction (the Z-direction). The conveyance unit 102 can be, for example, a belt conveyor. As illustrated in FIG. 21, the conveyance unit 202 of the imaging system 200 moves the imaging apparatus 201 in the second direction. The conveyance unit 202 can be, for example, a multi-copter, an airplane, or an artificial satellite. The use of the conveyance unit 202 enables a large test object that cannot be conveyed by, for example, a belt conveyor and a test object that is difficult to move to be imaged at positions in the second direction.

The imaging systems 100 and 200 can obtain pieces of image information related to positions in the second direction in a manner in which the imaging apparatuses image the readout regions in order while the conveyance units change the relative positions of the imaging apparatuses and the test objects. A two-dimensional image related to a specific wavelength can be generated by a calculation process or by changing the arrangement of imaged images by using the image-processing unit. To represent information about light and shade in the first direction by using the image information, spectral distribution (spectral information) may be generated by the image-processing unit, based on pieces of the information about light and shade at the respective wavelengths at a specific position in the second direction.

The conveyance units may move the imaging apparatuses and the test objects. The conveyance units may be capable of adjusting the relative positions of the imaging apparatuses and the test objects in the direction (the X-direction) of the optical axis. An optical member (a focus member) that can be driven may be disposed inside or outside the optical system 10, and the test object may be allowed to be focused by adjusting the position of the optical member.

Inspection Method and Manufacturing Method

A method of inspecting an object (the test object) and a method of manufacturing an article by using the optical system 10 according to the embodiment described above will now be described. The optical system 10 is suitable for inspection (evaluation) in industrial fields such as manufacturing industry, agricultural industry, and medical industry.

At a first step (an imaging step) of the inspection method according to the present embodiment, the object is imaged by using the optical system 10 to obtain image information about the object. At this time, the imaging apparatus and the imaging system described above can be used. That is, image information about the entire object can be obtained by imaging the object while the relative positions of the object and the imaging apparatus are changed. Image information of multiple objects can also be obtained in order (continuously). At the first step, pieces of the image information related to the respective wavelengths of light beams that are emitted from the optical system 10 may be obtained.

At a subsequent second step (an inspection step), the object is inspected based on the image information that is obtained at the first step. At this time, for example, a user (an inspector) may check (determine) the presence or absence of a foreign substance or a damage in the image information, or a control unit (the image-processing unit) may detect a foreign substance or a damage in the image information and notifies the user. A control unit that controls an article-manufacturing apparatus described later in accordance with the determination result of the presence or absence of a foreign substance or a damage may be used.

At the second step, the object may be inspected based on the spectral distribution of the object that is obtained by using pieces of the image information at the respective wavelengths. The unique spectral information of the object to be inspected can be detected by using the image information that is obtained by the optical system 10, and the components of the object can be consequently identified. For example, image information may be generated such that the image-processing unit emphasizes color for every spectral distribution, and the user may carry out inspection based on the image information.

The inspection method according to the present embodiment can be used for a method of manufacturing an article such as food, medicine, or cosmetics. Specifically, a material (an object) for manufacturing the article can be inspected by the inspection method described above, and the article can be manufactured by using the inspected material. For example, if it is determined that the material has the foreign substance or the damage at the second step described above, then the user (a manufacturer) or the manufacturing apparatus can remove the foreign substance from the material or can discard the material that has the foreign substance or the damage.

The inspection method described above may be used for inspection of malfunction of the manufacturing apparatus. For example, the presence or absence of malfunction may be determined based on image information about the manufacturing apparatus, and the operation of the manufacturing apparatus may be stopped, or the malfunction may be removed in response to the result of determination.

The preferred embodiment and the examples of the present invention are described above. The present invention, however, is not limited to the embodiment and the examples, and various combinations, modifications, and alterations can be made within the range of the spirit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical system comprising: a front group; a light-shielding member; and a rear group that are arranged in this order in a direction from a side of an object toward a side of an image, wherein
the light-shielding member is provided with an opening elongated in a first direction,
the front group has an aspherical surface, does not image the object at the opening in a first section parallel to the first direction, and forms an intermediate image of the object at the opening in a second section perpendicular to the first direction,
the rear group has a diffractive surface that splits a light beam that passes through the opening into light beams at different wavelengths in the second section and focuses the light beams on different locations in the second section, and
a tilt angle of the aspherical surface in the second section changes in the first direction.

2. The optical system according to claim 1, wherein the tilt angle of the aspherical surface in the second section changes such that positions at which an on-axis principal ray and an outermost off-axis principal ray enter the light-shielding member get closer to each other in a second direction perpendicular to the first direction.

3. The optical system according to claim 1, wherein the tilt angle of the aspherical surface in the second section monotonically changes in the first direction.

4. The optical system according to claim 1, wherein the front group has first and second aspherical surfaces that have a tilt angle in the second section, the tilt angle changing in the first direction.

5. The optical system according to claim 4, wherein a following condition is satisfied:

$$1.00 \leq |dT_1/dy|/|dT_2/dy| \leq 1.50,$$

where $|dT_1/dy|$ and $|dT_2/dy|$ are changes in tilt in regions of the first and second aspherical surfaces through which a light beam from a single object point passes.

6. The optical system according to claim 1, wherein a base surface of the diffractive surface is an aspherical surface.

7. The optical system according to claim 1, wherein in the first section, the front group has negative power, and the rear group has positive power.

8. The optical system according to claim 1, wherein the light-shielding member restricts a width of a light beam from the object in the first direction.

9. The optical system according to claim 1, wherein a width of the opening in the second section is 0.2 mm or less.

10. The optical system according to claim 1, wherein all of optical surfaces of the front group and the rear group are reflection surfaces.

11. An imaging apparatus comprising: the optical system according to claim 1; and an imaging sensor that receives an image that is formed by the optical system.

12. An imaging system comprising: the imaging apparatus according to claim 11; and a conveyor that changes relative positions of the imaging apparatus and the object.

13. The optical system according to claim 1, wherein in the second section, the front group and the second group have positive power.

14. An inspection method comprising: a first step of imaging an object by using an optical system to obtain image information about the object; and
a second step of inspecting the object, based on the image information,
wherein the optical system includes a front group, a light-shielding member, and a rear group that are arranged in this order in a direction from a side of the object toward a side of an image,
the light-shielding member is provided with an opening elongated in a first direction,
the front group has an aspherical surface, does not image the object at the opening in a first section parallel to the first direction, and forms an intermediate image of the object at the opening in a second section perpendicular to the first direction,
the rear group has a diffractive surface that splits a light beam that passes through the opening into light beams at different wavelengths in the second section and focuses the light beams on different locations in the second section, and
a tilt angle of the aspherical surface in the second section changes in the first direction.

15. The inspection method according to claim 14, wherein the first step includes a step of imaging the object while the object is moved in a direction perpendicular to the first direction.

16. The inspection method of claim 14, wherein the first step includes a step of obtaining pieces of image information related to respective wavelengths of the light beams.

17. The inspection method according to claim 16, wherein the second step includes a step of inspecting the object, based on spectral distribution of the object that is obtained by using the pieces of image information.

18. The inspection method according to claims 14, wherein the second step includes a step of determining presence or absence of a foreign substance in the object.

19. A manufacturing method comprising: a step of inspecting the object by using the inspection method according to claim 14; and
a step of manufacturing an article by using the object that is inspected in the step.

20. The manufacturing method according to claim 19, wherein the step of manufacturing the article includes a step of removing a foreign substance in the object.

* * * * *